(12) United States Patent
Borzestowski et al.

(10) Patent No.: US 8,156,060 B2
(45) Date of Patent: Apr. 10, 2012

(54) SYSTEMS AND METHODS FOR GENERATING AND IMPLEMENTING AN INTERACTIVE MAN-MACHINE WEB INTERFACE BASED ON NATURAL LANGUAGE PROCESSING AND AVATAR VIRTUAL AGENT BASED CHARACTER

(75) Inventors: Marek Borzestowski, Gdynia (PL);
Marek Trojanowicz, Gdansk (PL);
Marcin Strzalkowski, Warszawa (PL)

(73) Assignee: Inteliwise SP Z.O.O. (PL)

( * ) Notice: Subject to any disclaimer, the term of this patent is extended or adjusted under 35 U.S.C. 154(b) by 927 days.

(21) Appl. No.: 12/038,628

(22) Filed: Feb. 27, 2008

(65) Prior Publication Data

US 2009/0216691 A1    Aug. 27, 2009

(51) Int. Cl.
*G06F 17/00* (2006.01)

(52) U.S. Cl. .......................................... 706/45; 715/706
(58) Field of Classification Search ..................... 706/11, 706/45; 715/706
See application file for complete search history.

(56) References Cited

U.S. PATENT DOCUMENTS

| | | | |
|---|---|---|---|
| 7,027,975 B1 * | 4/2006 | Pazandak et al. | 704/9 |
| 7,028,265 B2 * | 4/2006 | Kuromusha et al. | 715/788 |
| 2002/0140718 A1 * | 10/2002 | Yan et al. | 345/706 |
| 2004/0075677 A1 * | 4/2004 | Loyall et al. | 345/706 |
| 2008/0104512 A1 * | 5/2008 | Tarlton et al. | 715/706 |
| 2008/0221892 A1 * | 9/2008 | Nathan et al. | 704/257 |

OTHER PUBLICATIONS

Inkpen, D.; Kipp, D.; , "A prototype natural language interface for animation systems," Haptic, Audio and Visual Environments and Their Applications, 2004. Have 2004. Proceedings. The 3rd IEEE International Workshop on , vol., No., pp. 153- 157, Oct. 2-3, 2004.*
Ladislav Kunc and Jan Kleindienst. 2007. ECAF: authoring language for embodied conversational agents. In Proceedings of the 10th international conference on Text, speech and dialogue (TSD'07), Sep. 2007.*

* cited by examiner

*Primary Examiner* — David R Vincent
*Assistant Examiner* — David H Kim
(74) *Attorney, Agent, or Firm* — Baker & McKenzie LLP

(57) ABSTRACT

An interactive virtual agent (avatar) system includes a plurality of databases configured to store at least one of client specific information and non-client specific information, internal resources configured to provide access to information sources, the character interface configured to receive information from a user, and respond to the user with information based on the received information, a processing engine coupled with the client knowledge database, the basic knowledge database, the internal resources, and the character interface.

16 Claims, 41 Drawing Sheets

SYSTEMS AND METHODS FOR GENERATING AND IMPLEMENTING AN INTERACTIVE MAN-MACHINE WEB INTERFACE BASED ON NATURAL LANGUAGE PROCESSING AND AVATAR VIRTUAL AGENT BASED CHARACTER

BACKGROUND

1. Technical Field

The embodiments described herein relate to online services that include an interface for inputting and outputting information, based on Natural Language Processing, and more particularly to the generation of a virtual agent to act as the user interface and to handle the input and output of information.

2. Related Art

The next generation of the Internet will be based on Artificial Intelligence solutions. On-line applications will mimic real world interactions. The Personal Internet of the future will be where more computing power and high-speed internet connections will enable richer interaction among users and multimedia content. Interfaces based Natural Language Processing and tools for their creation, are becoming popular because Web sites are overloaded with content that is hardly available to users.

Avatars and virtual humans are becoming more and more popular in online and computer based environments. For example, avatars are used as video game characters, as representations associated with email accounts or on a personal web page, such as a personal social network page, and in advertising and other content.

Further, Web sites are becoming increasingly popular as a way to contact customers and convey the key messages from the customer service team. On such sites, a customer or other user can input information and/or questions, navigate menus, and obtain information. Such sites can be interactive, i.e., the user can pose questions or input information through a user interface and the system can respond with further questions or information in an interactive manner that allows the customer or user to obtain, or arrive at the desired information.

Often such interactive user interfaces can be difficult to use or un-intuitive, which can lead to low customer satisfaction or lower usage or adoption of the service. One problem is that customers are used to dealing with people in an interactive manner, and such systems do a poor job of replicating the human experience.

SUMMARY

An interface based on Natural Language Processing, including an interactive virtual agent (avatar) system comprises a dialogue window and possibly a visual character interface that can receive spoken input and respond with spoken input. The character interface can also comprise a visual character component that can include a video character or a cartoon character and that can be configured, along with the spoken output capability (TTS—text-to-speech) and spoken input (STT—Speech-to-text), to provide a humane like interface for, e.g., customer service or intuitive data retreival.

In one aspect, the NLP with an interactive virtual agents (avatar) system can comprise a plurality of databases configured to store at least one of client specific information and non-client specific information, internal resources configured to provide access to information sources, the character interface configured to receive information from a user, and respond to the user with information based on the received information, a processing engine coupled with the client knowledge database, the basic knowledge database, the internal resources, and the character interface.

The processing engine can be configured to receive input from the character interface, parse the input using a knowledge model to determine the content of the input, determine relations that apply to the parsed content, perform at least one of deduction, generalization, context expansion and synonym finding on the content using the determined relations, using a knowledge model, and at least one of the plurality of databases, the internal resources, and external resources, determine an appropriate response to the input, and provide the response to the character input to be output to the user.

The interface with NLP, basing on command input by user in natural language, can navigate through Website, open external links, and can also fill out application forms and research application forms. Moreover, the processing engine together with databases can be configured to play defined scenarios that reflect business processes, procedures of sales, customer care or consulting performed by real people. The Avatar can be based on video recording of the real salesperson performed during a recording session with the use of the InteliWISE software;

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 19-40 are screen shots illustrating screens that can be presented to an administrator by a knowledge engine module included in the configuration interface of FIG. 18.

DETAILED DESCRIPTION

Figure 1:
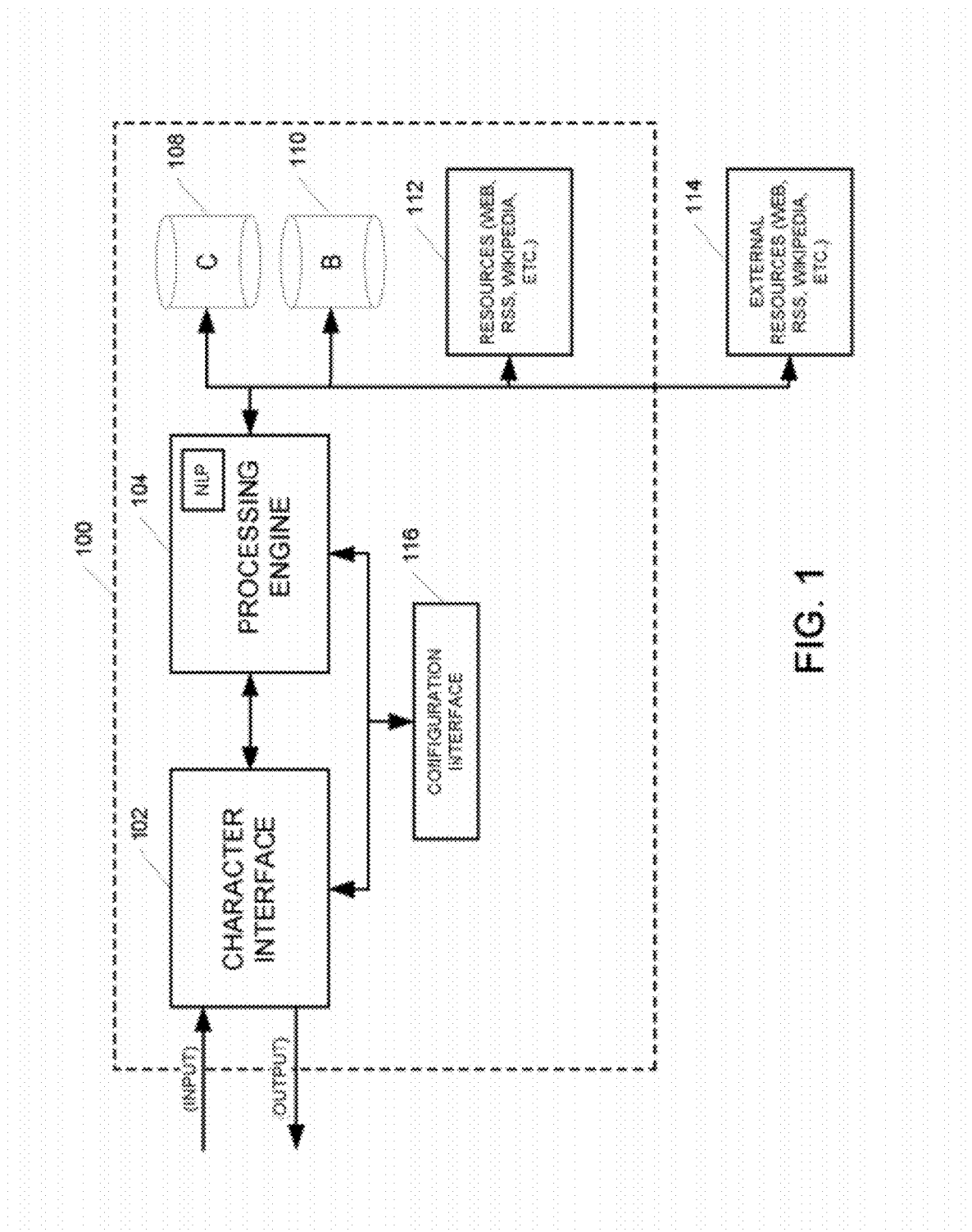
FIG. 1 is a diagram illustrating an interactive avatar system in accordance with one embodiment.

FIG. 1 is a diagram illustrating an example interactive avatar system 100 configured in accordance with one embodiment. System 100 can be used to generate, configure, and implement an interactive avatar service. As can be seen, system 100 comprises a character interface 102, a processing engine 104, a plurality of knowledge databases including a client knowledge database 108 and a basic knowledge database 110, internal and external resources 112 and 114 respectively, such as, e.g., information from the Internet/web, RSS feeds, Wikipedia information, etc.

In the description that follows, software instructions to routines used by system 100, and more particularly processing engine 104 to perform the functions described are referred to using the following format (CLASS_Type), e.g., (IAST_Word).

Figure 38A:
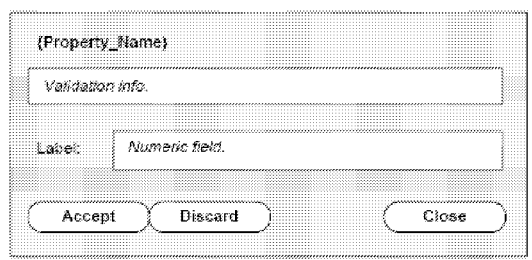
Figure 38B:
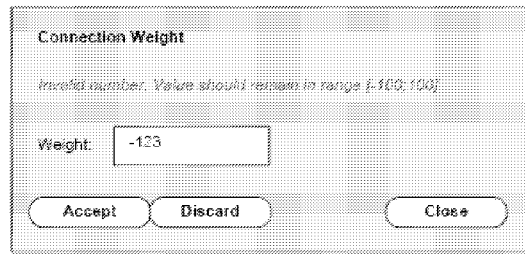

FIGS. 38A and 38B are screen shots that illustrate example screens the administrator can use to define a number unit and its connection weight.

Figure 39A:
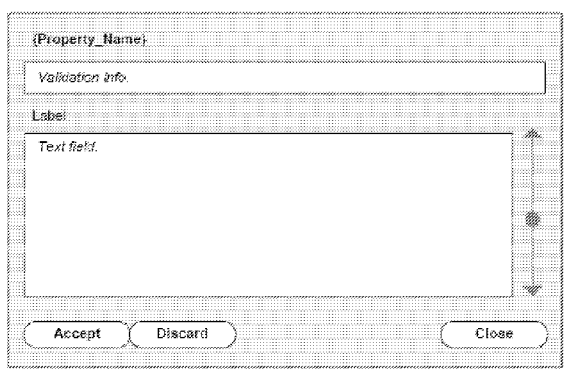
Figure 39B:
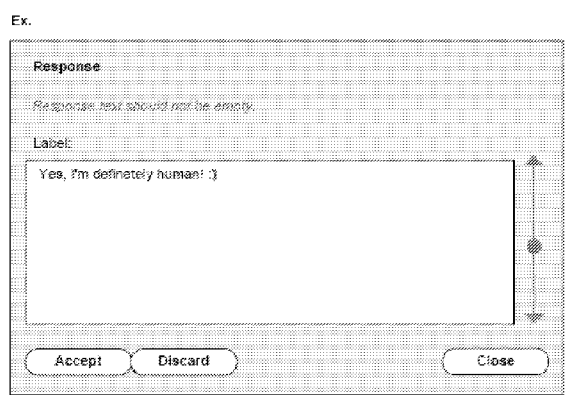

FIGS. 39A and 39B are screen shots illustrating example screens that the administrator can use to define a text unit and its response.

Figure 40A:
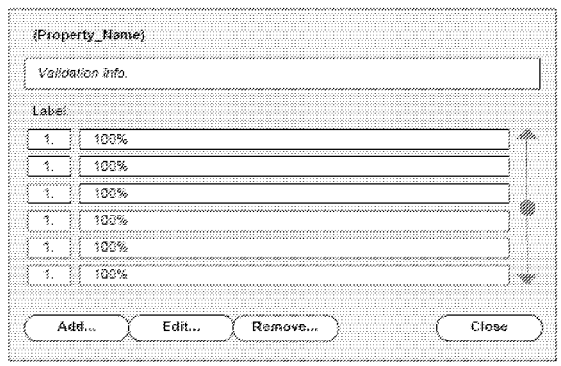
Figure 40B:
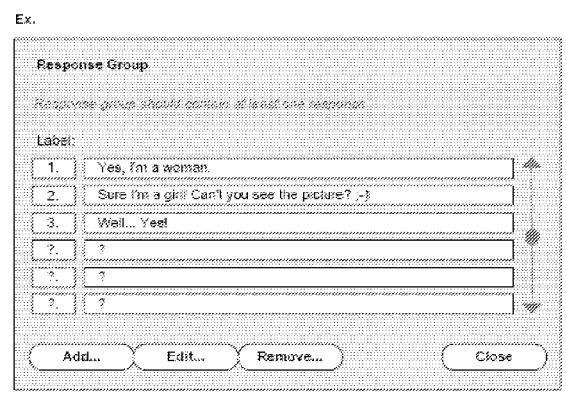

FIGS. 40A and 40B are screen shots illustrating example screens that the administrator can use to define a list unit and its response groups.

RSS, which is formally known as "RDF Site Summary", and known colloquially as "Really Simple Syndication," is a family of Web feed formats used to publish frequently updated content such as blog entries, news headlines or podcasts. An RSS document, which is called a "feed", "web feed", or "channel," contains either a summary of content from an associated web site or the full text. RSS makes it possible for people to keep up with their favorite web sites in an automated manner that's easier than checking them manually.

RSS content can be read using software called an "RSS reader", "feed reader," or an "aggregator". The user subscribes to a feed by entering the feed's link into the reader or by clicking an RSS icon in a browser that initiates the subscription process. The reader checks the user's subscribed feeds regularly for new content, downloading any updates that it finds.

The initials "RSS" are used to refer to the following formats: Really Simple Syndication (RSS 2.0), RDF Site Summary (RSS 1.0 and RSS 0.90), Rich Site Summary (RSS 0.91), and RSS formats are specified using XML, a generic specification for the creation of data formats.

Thus, e.g., processing engine 104 can include and aggregator configured to process RSS feeds received form either internal resources 112 or external resources 114. Processing engine 104 will be described in more detail below.

System 100 can be a hybrid of a semantic web and a structure similar to the multi-layered, self organized, context-dependent, artificial neural net. System 100 can be configured to allow users to engage in an interactive inquiry with system 100 in order to obtain sought after information in a manner that closely mimics human interaction. For example, system 100 can be configured to allow a user to verbally provide inquiries and information and to receive spoken information via character interface 102. In order to enable such ability, processing engine 104 can comprise a natural language processor 106 as described in detail below.

In such embodiments, processing engine 104 can be configured to analyze sentences either written or spoken by the user, e.g., using natural language processor 106, and to find the most relevant answer in one or more knowledge bases, e.g., knowledge data bases 108 and 110. Processing engine 104 can also be configured to generate visual or verbal responses, which can be provided via character interface 102.

In addition to providing a verbal interface, character interface 102 also provides a visual interface that includes an avatar. For example, character interface 102 can provide a full featured, interactive video character (avatar). Character interface 102 can be configured to provide a video stream, dialogue sentences with full voice synthesis using, e.g., text-to-speech technology, and much more. This can enable user friendly dialogue presentation through applications provided via a typical web page or, e.g., a Second Life platform, or a stand alone platform, such as a desktop application or mobile application including, e.g., a widget.

System 100 can be implemented via a server or servers and can be accessed, e.g. using a web browser. In certain embodiments, an Adobe Flash plug-in can be required for accessing system 100 through character interface 102.

Processing engine 104 can include the hardware and software necessary to perform the functions described herein. As such, processing engine 104 can be implemented on a computer, workstation or serve and can actually comprise one or more processors or controllers configured to perform instructions to produce the results and perform the functions described herein. It will be understood that these instructions can be stored in some form of memory interfaced with processing engine 104.

More specifically, processing engine 104 can, in certain embodiments, be configured to analyze sentences spoken by the users and look for relevant answers in the knowledge bases 108 and 110. Processing engine 104 can be configured to then provide the answer in human natural language.

Processing engine 104 can be implemented as a hybrid of a semantic net, where each of the net's elements, e.g., words, questions, etc., are independent and unique. Relations can be defined and used to combine all the elements into a net. Using the relations, system 100, and more particularly processing engine 100 can be ready for deduction, generalization, context expansion, and finding synonyms. The hybrid can also comprise a structure similar to a multi-layered, self-organized, context-dependent, artificial neural net that uses a learning process based on training sets.

Processing engine 104 can be configured to use, while keeping separate, a basic knowledge base 108 and a client knowledge bases 110, which will be described in more detail below.

Thus, processing engine 104 can provide determinism on the semantic level, and generalization on the semantic and artificial neural network structure level. Processing engine 104 can also provide a learning process, which can be an extension of the semantic knowledge. For example, system 100 can use training sets including unions, preferences, and characteristics of each element of the net. Processing engine 104 can also provide easy reconfiguration due to the separation of the semantic knowledge from the memory-associated knowledge, and can be configured to change different net characteristics spread on the same knowledge.

Referring again to FIG. 1, it can be seen that system 100 can include a configuration interface 116 that can be used to configured character interface 102 and processing engine 104. While the process of configuration is described in more detail below, the configuration will be described here. Depending on the embodiment, there can be two aspects that influence engine configuration: the knowledge model, as a sort of configuration instance, and the configuration of the character interface, e.g., the avatar or assistant. For example, apart from the assistant's gender, specific customer's needs are involved, such as changes in sentence selection sequence depending on the current campaign (product lines), conditional disabling of some parts of the model in relation to the web site section where the assistant is embedded, e.g., to avoid creating separate knowledge bases for each assistant.

Figure 2:
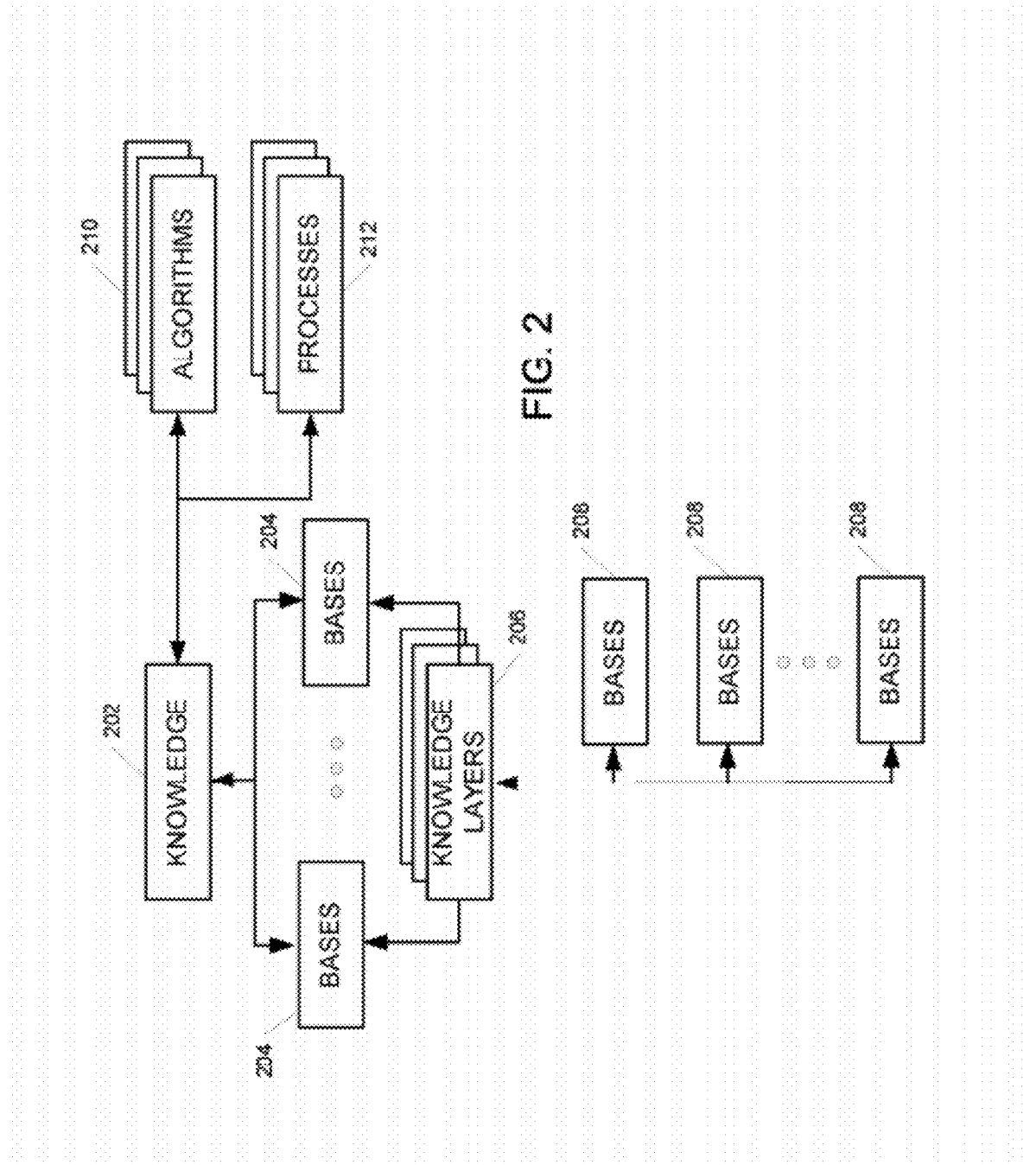
FIG. 2 is a diagram illustrating the hierarchical configuration of the processing engine illustrated in the system of FIG. 1 in accordance with one embodiment.

FIG. 2 is a diagram illustrating the hierarchical structure 200 of components used to configure processing engine 104. As can be seen, the structure 200 can comprise a knowledge model that includes, or makes use of one or more knowledge bases 204. The knowledge bases 204 can in turn include or make use of knowledge layers 206, which can also be referred to as knowledge unit types. Each knowledge layer or type 206 can comprise a plurality of sub-layers 208. The knowledge model can then make use of various algorithms 210 and/or processes 212 to process information consistent with the model, i.e., consistent with the bases 204, layers 206, and sub-layers 208 that make up model 202.

Thus, knowledge layers 204 can be defined as data of some kind gathered in one in one set, from which various subsets or bases 204 can be selected or formed. Example types of knowledge layers 206 can include: words (IAST_Word), which can comprise single common words used in the process of atomization elements of the question; notions (IAST_Notion), which can comprise complex phrases and sentence constructions that are impossible to define at the word level, but also common phrases, functioning as notional units, e.g. tourism which is a notion comprising knowledge on the subject, woman which is a notion comprising knowledge about a woman, as well as synonymous expressions; patterns (IAST_Pattern/IAST_PatternComponent), which can comprise patterns and their components in a fixed order allowing for matching complex sentence constructions and transferring them to notion level or directly to response groups; response groups (IAST_ResponseGroup), which can be defined as identical reactions to the impulses generated by a similar question; responses/answers (IAST_Response/IAST_ResponseComponent), which can include specific responses in reaction to the impulses of a verbal (Text/Audio), visual (Video), or complex (RSS, Wikipedia) nature; relations (IAST_Relation), which can include connections of certain type and direction; and questions (IAST_Question), which can comprise excessively stored, original questions composing separate knowledge bases 204 and which can be necessary for quick visualization of the polling process as well as for statistical purposes.

Relation types or sub layers 208 can include, e.g., (IAST_RelationType), which can be used for building the network and combining many knowledge layers 206, e.g. relations transforming a group of words into a notion (phrase), relations leading from a notion to a response group, etc.

The knowledge model 202 (IAST_KnowledgeModel) can then consist of a plurality of knowledge bases (IAST_KnowledgeBase) 204 of specific type (IAST_KnowledgeBaseType). The model should be understood as a list of components used to build a working model of the web and providing it with a base for specific purposes. For example, knowledge model 202 can comprise a general purpose knowledge base(s) 204, which can consist of various knowledge layers 206 with emphasis on the path leading from a question to a response.

Such a base should, e.g., comprise the following layers: words (IAST_Word), notions (IAST_Notion), patterns (IAST_Pattern), e.g., to be used in the process of controlled deduction, groups of responses (IAST_ResponseGroup) acting as collections of different versions of responses to the same question, the responses themselves (IAST_Response) with different text, video, audio etc. components, constituting the atomic group of reactions for stimulation (IAST_ResponseComponents), which can act as "fuel" for processing engine 104, and without which engine 104 does not possess any knowledge.

Knowledge model 202 can also comprise a correction knowledge base(s) 204, which can contain additional misspelled words (IAST_Word), separated from other knowledge bases, allow for correcting spelling errors made by the user when entering questions, and contain a set of relations (IAST_Relation) mapping incorrect words onto correct ones. In the case of dictionaries of inflection, declension and conjugation, two types of relations can be used: one for mapping a word onto the base form and the other for mapping the base form onto its many variants. This is described in more detail in relation to the description of the engine operation algorithm below.

Knowledge model 202 can also comprise a generalization knowledge base(s) 204, which can comprise relations of various types that can permit drawing conclusions, e.g., Thesaurus with its four types of relations between notions: synonym, anonym, superior notion, and subordinate notion. In certain embodiments, only synonyms are taken into consideration.

Knowledge model 202 can also comprise a multiplicative knowledge base(s) 204, which can allow weighing relations between specific knowledge layers 206 and the units placed therein.

The use of such bases and through the process of self-learning, weighting spread across the whole net or its subset can be generated quickly and decisions generated by engine 104 can be influenced in a selective manner. In other words, gained weightings decrease or increase the ratings of notes of conclusion combinations inside engine 104 in the optimal way, changing only the variants generated by engine 104 in accordance with the spread weighting.

Various algorithms 210 and/or processes 212 can then work on, or in conjunction with model 202 to produce accurate results. For example, a preliminary analysis question parsing algorithm 210 can be configured to use only the word layer (IAST_WORD) when a question is received via character interface 102. The algorithm can, e.g., be configured to clean up an extra signs, symbols or redundant characters and replace them with spaces, to break sentences into words, match the words with all data in the word layer (IAST_Word) and transform the words into (IAST_Word) type of objects that indicate the word from the base, and wait for further actions in consecutive steps in relation to unmatched words.

A misspelling correction algorithm 210 can be configured to use correction knowledge bases 204 to transform unmatched words using model dictionaries, e.g. spelling dictionary, transform misspelled words into their proper versions, or use a conjugation dictionary, which creates another version of a word for each conjugation from the dictionary. At this point, if a word has not been matched or broken into possible versions, it can be removed from the question vector. The result is a set of seamless vectors consisting of objects of (IAST_Word) type, forwarded as separate questions to the further algorithm levels.

With respect to preliminary variant weighting: default opening weights can be 100% for each word; however, in other embodiments correction dictionaries with more probable words and their conjugation forms, which will allow at this stage for discriminating less probable variants containing swapped words, can be used.

A preliminary generalization algorithm can be configured to use generalization (association) bases to change words into notions and/or notions into notions, creating successive variations of a question with objects, or a group of objects replaced with a new, superior instance (IAST_Word objects transform into IAST_Notion). After each transformation, the rating of particular terms can be degraded according to the associated rules. For example, rules can define how ratings are handled for words transformed into a notion and for notions transformed into other notions.

The rating of a group of words transformed into a notion can, e.g., be degraded to the average of particular words depending on the degree of element sequence change. For example, if the original sequence is maintained, then a factor of 1.0 can be used, i.e., no change can be represented by 1.0. But if there is a transposition of two words placing them a distance X, where X stands for a number of words between these words, then a factor of $0.9^X$ can be used. Thus, each new detected transposition can cause consecutive degradation of the resulting element, The rating of elements when a notion is transformed into another notion can produce a rating in accordance with the strength of relation between the notions. For example, each generalization may not result in replacing the variant, but on the contrary can cause generation of another variant of the question in which some notions have transformed into others and their element ratings underwent degradation.

Certain process 212 can also be used to further process information in accordance with model 202. For example, a process 212 for matching statement variants to the responses can use general bases 204 in which resulting variants of notions that form a question are matched with the relations forming groups of responses in terms of their content. Further, partial matching based on a subset of the question elements is possible. In the case of partial match of the question elements and a group of responses, the rating of such a group undergoes degradation proportional to overlay of the elements in a group of relations leading to a given group of responses. When all elements are matched there can be no degradation. But when n elements of k relation components are matched, and n<k, the degradation can be n/k. Consecutive degradations of a given group of responses can take place depending on the elements order matched to a group of relations. Each change of the word order can result in degrading of a given group as described above.

A net weighting process 212 can use bases 204 to multiply the whole net. For example, specific answers can be chosen from groups of responses, answers can be rated based on the group rating, rating of the answer can be overlaid with the rating resultant from configuration of a given group of responses, e.g. when there is a certain order, consecutive responses can receive a rating of $0.99^X$ factor, where X stands for position on the list of responses, just to differentiate then in terms of order, and the response rating created can be overlaid with weightings assigned to the responses within the group using the following; factor=weight of response/sum of weights within the group of responses. Reinforcements or weakenings originating from response multiplying base in the context of the asked question can be overlaid on specific responses.

A decision making process 212 can then be used, e.g., in the case of lack of response matching or low level of rating, i.e., many generalizations or weighting with negative factors. Depending on the embodiment, looping back and re-search of the stimulated notion environment is allowed. In the case where the responses are found, then the one with the highest rating can be chosen. In the case where the response of the highest rating has already been presented, e.g., according the statistics, during the current dialog, then the choice of the consecutive response with the rating not more distant than epsilon (configuration) or reiteration of the response with the highest rating when there is no response of similar rating.

A process 212 can also be implemented for saving all variants and their rating along with deduction history and the relations involved.

Thus, processing engine 104 can use a model, or models 202 and the associated bases 204, layers 206, sub-layers 208, algorithms 210 and process 212 to process received information, e.g., questions, interpret the questions, and identify the most likely notions being expressed by the question, and to then generate responses based on information in the knowledge data bases 108 and 110 and form the internal and external sources 112 and 114 respectively. This process can involve transforming words and notions included in the received information or question and then rating the transformed question in order to determine the likelihood of a proper interpretation. These transformation and ratings can be saved in order to improve performance in the future, e.g., to allow engine 104 to learn the most likely match for questions received through character interface 102.

Engine 104 can then generate appropriate responses. In this respect, engine 104 can include or can be partially implemented as a "bot." A bot, also known as an Internet bot, web robot, or WWW robot is a software application that runs automated tasks over the Internet. Typically, bots perform tasks that are both simple and structurally repetitive, at a much higher rate than would be possible for a human editor alone. The largest use of bots is in web spidering, in which an automated script fetches, analyses, and files information from web servers at many times the speed of a human. Each server can have a file called robots.txt, containing rules for the spidering of that server that the bot is supposed to obey.

In addition to their uses outlined above, bots can also be implemented where a response speed faster than that of humans is required, e.g., gaming bots and auction-site robots, or less commonly in situations where the emulation of human activity is required, for example chat bots. Bots are also being used as organization and content access applications for media delivery.

Thus, once the question has been ascertain using the model 202, algorithms 210 and processes 212, response can be gathered via implementation of a bot.

Figure 3:
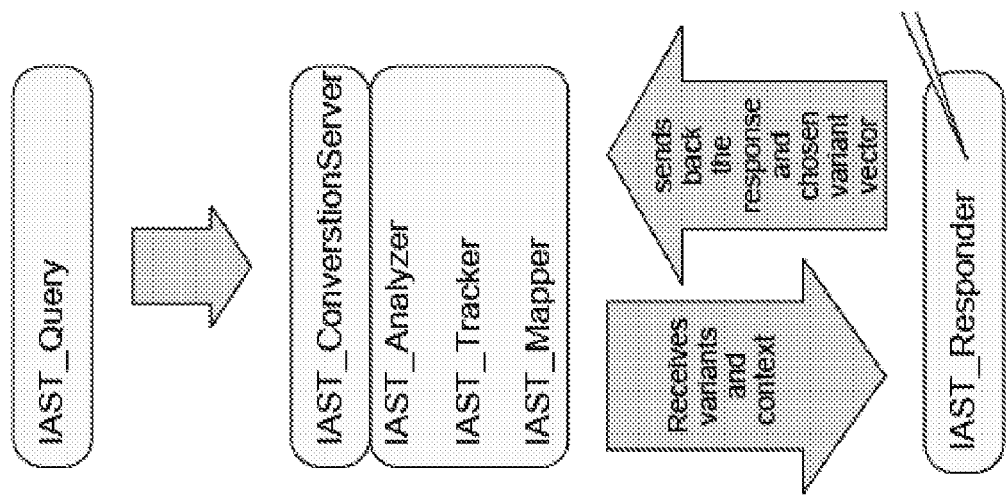
FIG. 3 is a diagram illustrating the process flow and processes used by a processing engine included in the system of FIG. 1 to process a query and generate a response in accordance with one embodiment.

FIG. 3 is a diagram illustrating the process flow and processes used by processing engine 104 to process a query and generate a response in accordance with one embodiment. First, when a query is received, an instance of the query handler (IAST_Query) is generated and passes he query string to the conversation server (IAST_Conversation-Server). The conversation server then passes the query string to the query analyzer (IAST_Analyzer). The Analyzer then creates (IAST_Tracker) and passes the query string to (IAST_Tracker). (IAST_Tracker) then passes the query string back to (IAST_analyzer) with information about the current conversation context. If the query string is a command to go back into the conversation context, (IAST_Tracker) submits the query string recalled from conversation history and passes it to (IAST_Analyzer) with information about the redundant query.

(IAST_Analyzer) can then split data in the query string into chunks and transform them into (IAST_Words). If some chunks cannot be transformed into (IAST_Words), (IAST_Analyzer) can be configured to then try to map them using (IAST_Word) relations of the special knowledge base layer (Word Correction Dictionary). If a misspelled word is found then it is mapped again into the (IAST_Word) unit.

The (IAST_Analyzer) can then enter the cyclic matching loop where it: a) creates multivariate response map on each stage of the loop, b) tries to map as many simple knowledge units into (IAST_Responses) as it can, where each possible configuration can give an alternative response schema, and where c) (IAST_Words) are mapped in the context of (IAST_KnowledgeBase) resulting from the configuration and on various layers configured in the system, d) a special path constructs client knowledge base context, i.e., it tries to map (IAST_words/IAST_Notions) directly into (IAST_Responses) in the context of the client knowledge base, e) the remaining variants are built upon the configured knowledge base contexts, f) if some (IAST_Words) do not lead to (IAST_Responses), then they are mapped using special knowledge base relation (Thesaurus) using a subset of synonyms to remap a word into another word with the same meaning, and if the mapping results in a list of synonyms, then each of them is mapped against the rest of knowledge base layers and positive hits give other variants of the responses, and g) the cyclic loop stops if there are no simple knowledge units to be mapped, i.e., most of them were mapped into (IAST_Responses).

The (IAST_Analyzer) can also be configured to pass its conversation context, redundant query information, and the tree of possible responses (IAST_ResponseGroups) to (IAST_Responder).

The (IAST_Tracker) can be configured to keep track of the conversation taking place. For example, it can store its data into session data and log the data into a statistics database. The responsibilities of the (IAST_Tracker) can include: 1) keeping track of the current conversation context, 2) storing statistics into the database, 3) making it possible to go backward in the conversation, e.g. on "back" command it recalls the previous conversation point and gives (IAST_Analyzer) the previously submitted query string (note: the response can be different, because it informs IAST_Analyzer about the previous occurrence), and 4) informs (IAST_Analyzer) about redundant queries.

(IAST_Tracker) can be configured to use (IAST_Mapper) to map knowledge units from one quantity into another and "knows" which layer to use basing on the type of knowledge quantity (IAST_KnowledgeUnitType).

(IAST_Responder) can be configured to make the final choice and give the response back to (IAST_ConversationServer). For example, it can be configured to browse through the given variants. It can be preferable to use fully mapped variants, where there are no unmapped knowledge units e.g. (IAST_Words in the vector). (IAST_Responder) can also be configured to compare the weights of given responses (IAST_ConnectionWeights), and chose the variant with the highest score and then chooses the response from (IAST_ResponseGroup) depending on the conversation history. It can also be configured to store the responses sent in the past.

(IAST_Responder) can be configured to send back to (IAST_ConversationServer) the response and the vector of the chosen quantities to be stored by (IAST_Tracker) into the new conversation context and history.

Figure 4:
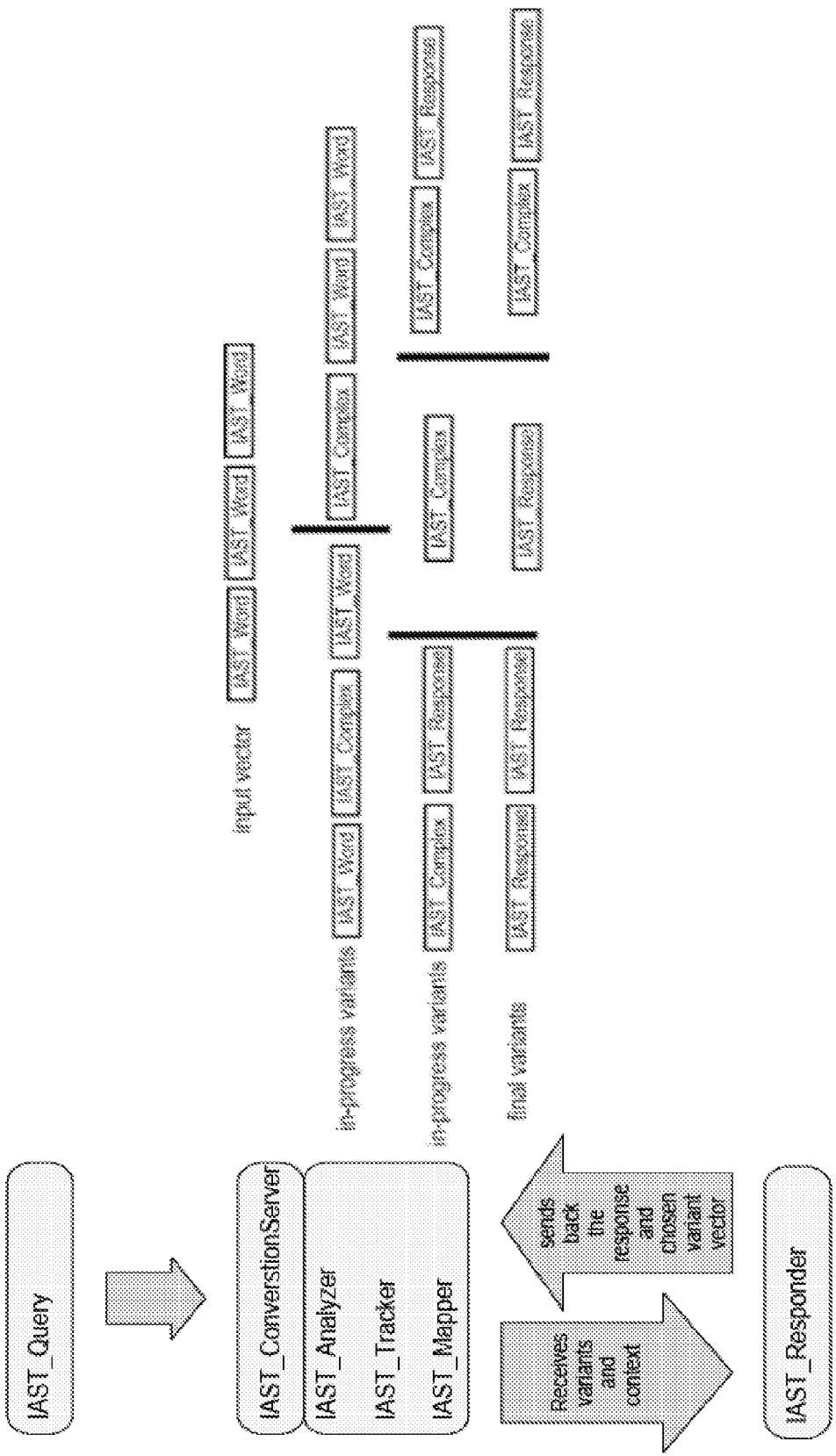
FIG. 4 is a diagram illustrating the example mapping of variants generated during the process illustrated in FIG. 3.

FIG. 4 is a diagram illustrating example mapping of variants using the processes described above. The mapping of FIG. 4 illustrates how an input vector, e.g., a query can be transformed into variants that can be mapped to responses. Sometime it is possible or necessary to map in progress variants to intermediate responses; however, other times further analysis is required to arrive at the final response.

Figure 5:
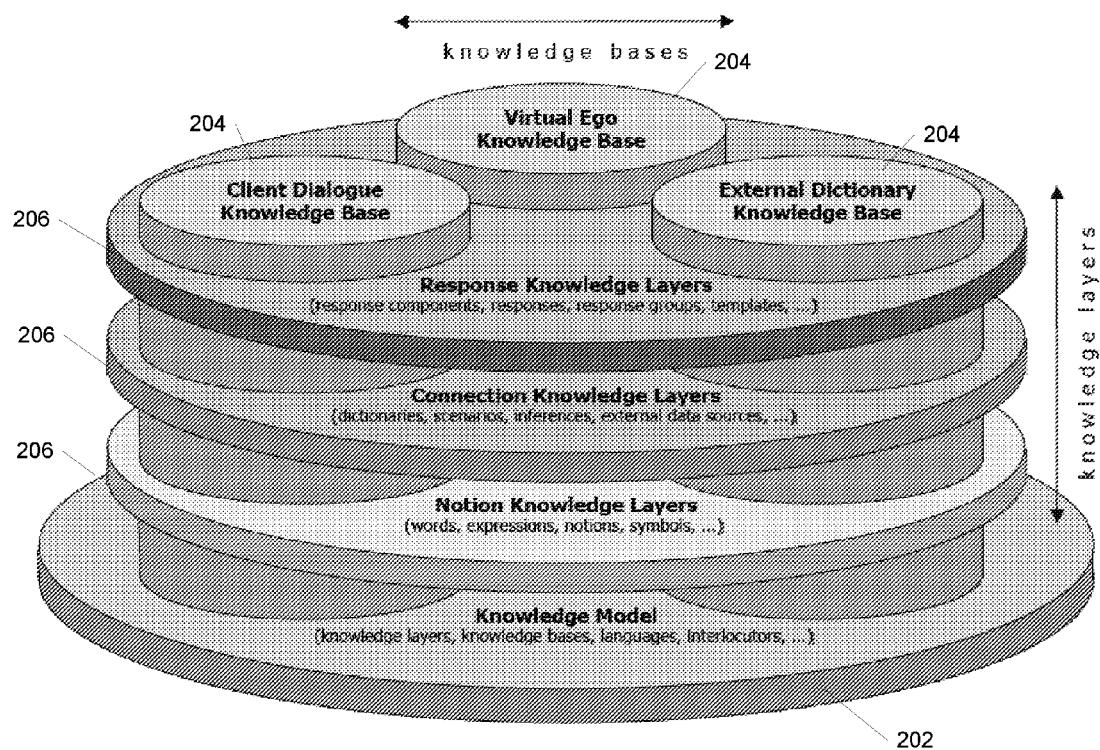
FIG. 5 is a diagram illustrating a graphical illustration of a knowledge model illustrated in FIG. 2 in accordance with one embodiment FIGS. 6A and 6B graphically illustrate how various bases, layers, and connection weights can role up into the model of FIG. 5.
Figure 6A:
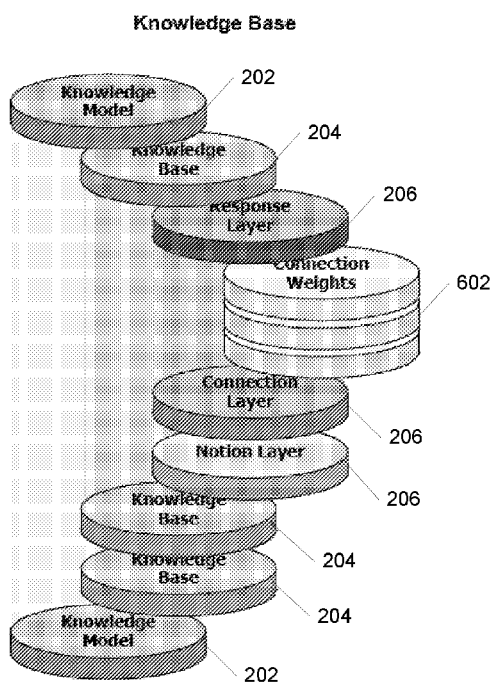
Figure 6B:
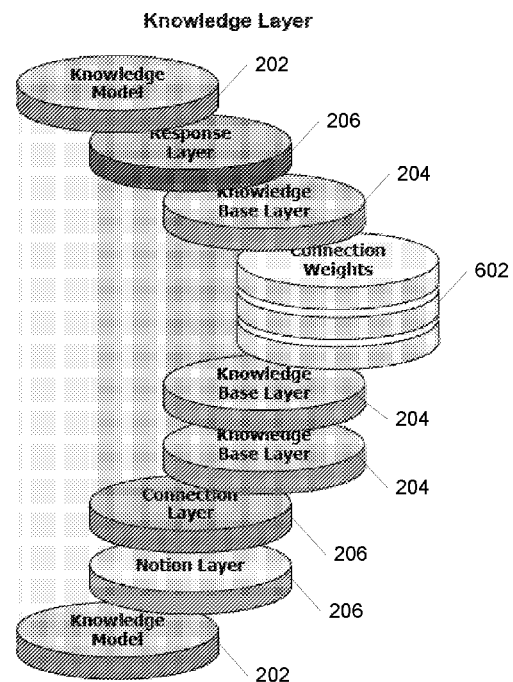

FIG. 5 is a diagram illustrating a graphical illustration of a knowledge model 202 in accordance with one embodiment. As can be seen, the graphical illustration of FIG. 5 provides a three dimensional view of the interrelationships between the bases 204 and layer 206 that form model 202. FIGS. 6A and 6B are diagrams graphically illustrating the architecture of FIG. 5 in a knowledge base centric view (FIG. 6A) and a knowledge layer centric view (FIG. 6B). FIGS. 6A and 6B graphically illustrate how various bases 204, layers 206, and connection weights 602 can role up into a model 202.

Figure 7:
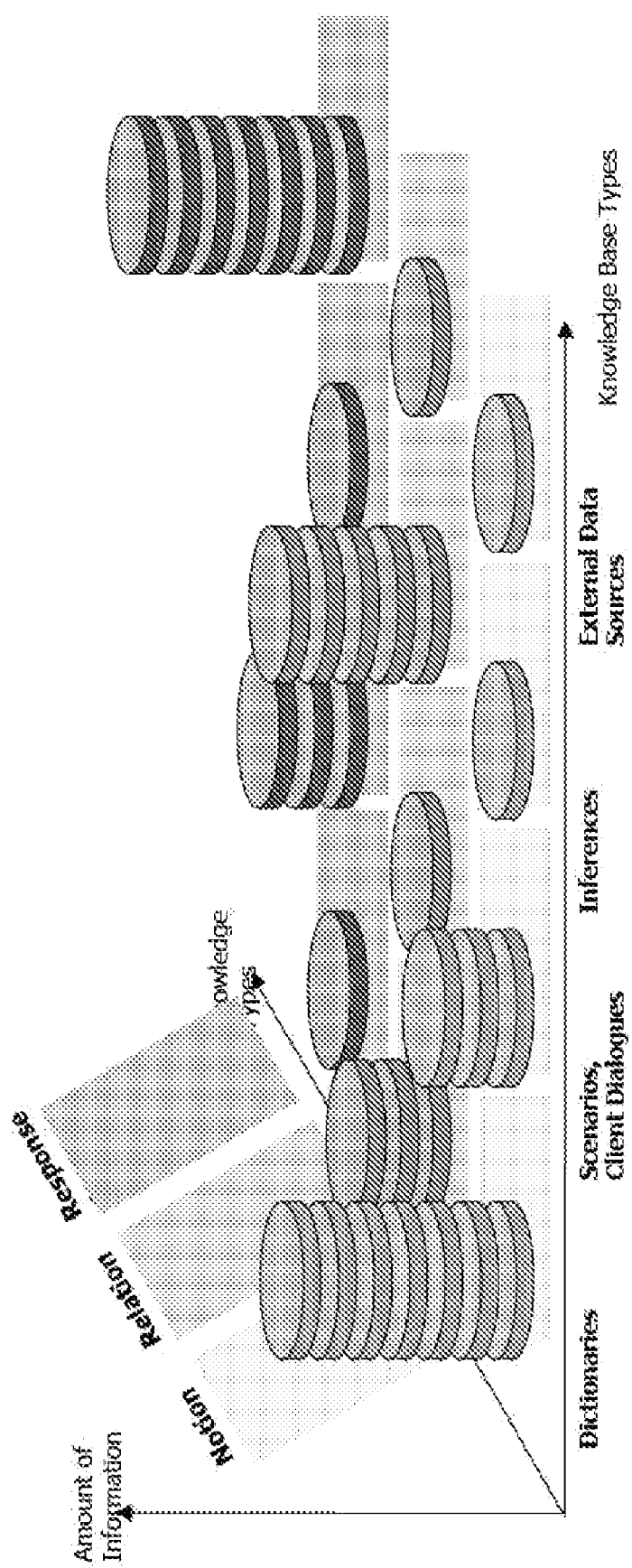
FIG. 7 is a graph illustrating different knowledge model configurations for different knowledge model base types.

FIG. 7 is a graph illustrating different knowledge model configurations for different knowledge model base types. The graph of FIG. 7 illustrates the amount of information (z-axis) that can exists at the intersection of the knowledge types and knowledge base types along the x and y axis.

Figure 8:
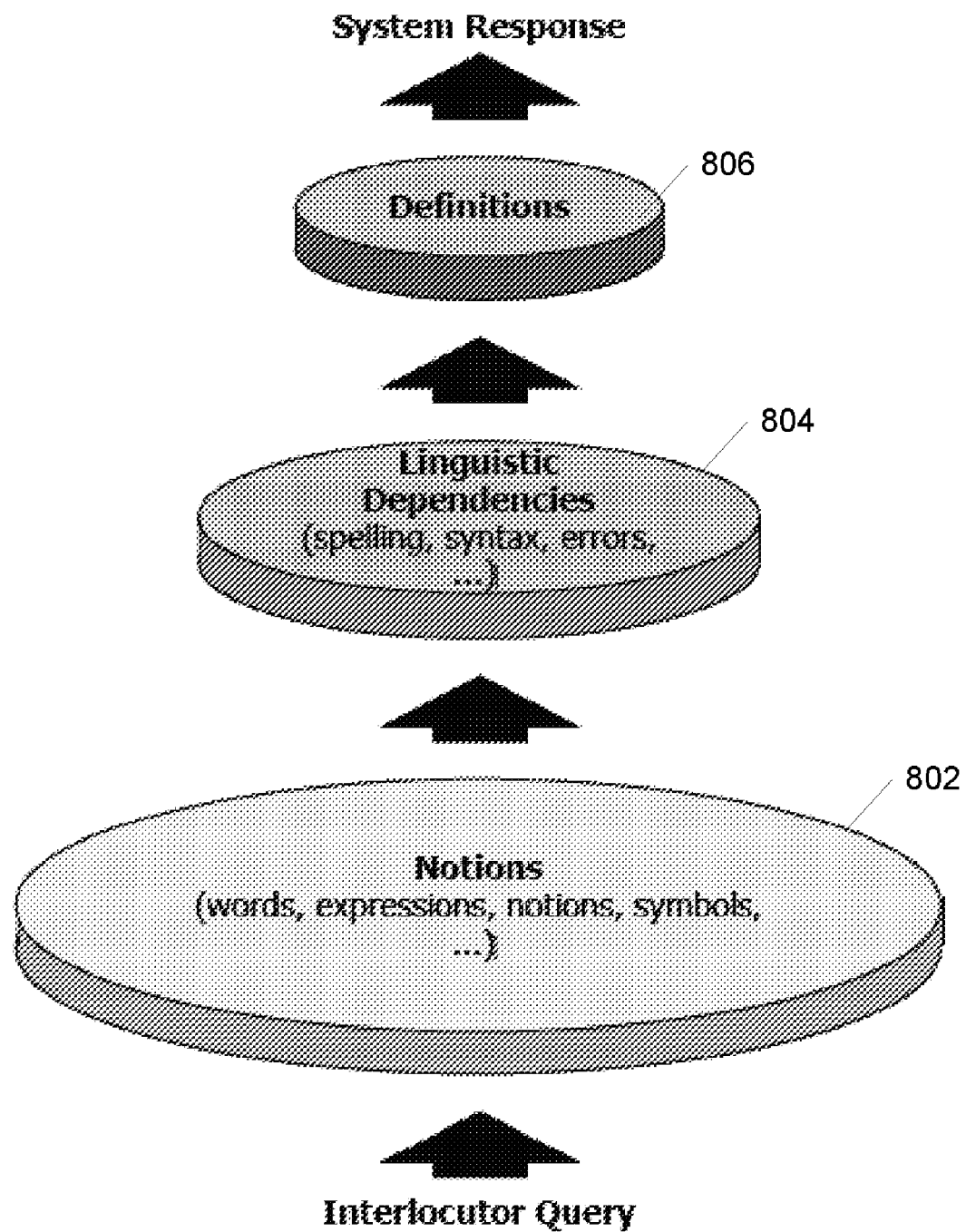
FIG. 8 is a diagram illustrating the process for generating a response using a dictionary knowledge base.

FIGS. 8-11 are diagrams illustrating how a response can be generated using various knowledge bases 204. In practice the base 204 used to generate a response will depend on the model 202 being used and the point in the process of interpreting a question and generating a final response. Referring to FIG. 8, the process for generating a response using a dictionary knowledge base is illustrated. As can be seem, a query is first broken down into notions comprising words, expressions, notions, symbols, etc., at the notion level 802. Linguistic dependencies, including spelling, syntax, errors, etc., are then determined at eh connections level 804. Finally, definitions can be determined at the response level 806.

Figure 9:
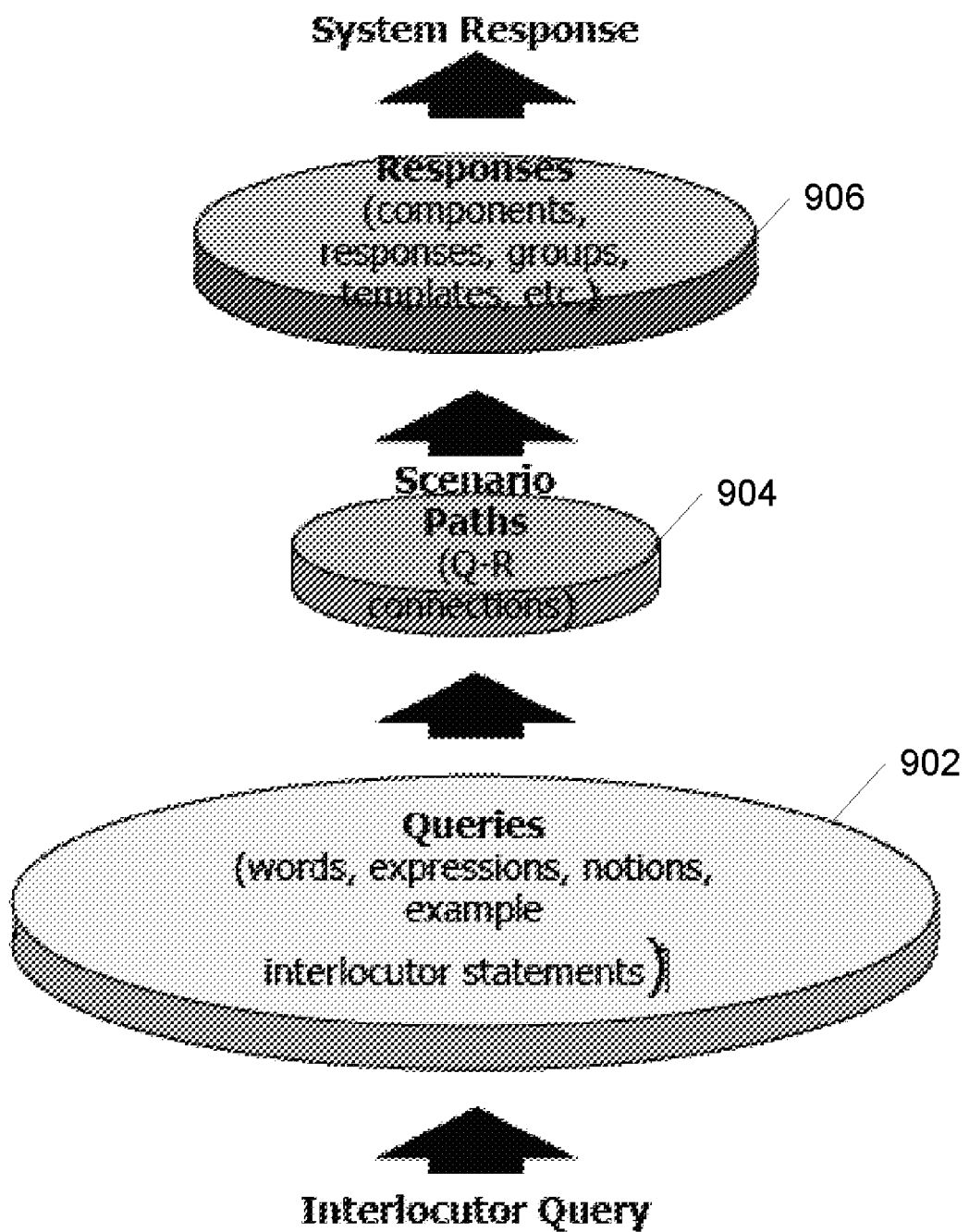
FIG. 9 is a diagram illustrating the process for generating a response using a scenario knowledge base.

Referring to FIG. 9, the process for generating a response using a scenario knowledge base is illustrated. As can be seem, a query is first broken down into words, expressions, notions, and, e.g., interlocutory statements, at the notion level 902. Scenario paths are then generated at the connections level 904. Responses comprising component responses, groups, templates, etc., can then be generated at the response level 906.

Figure 10:
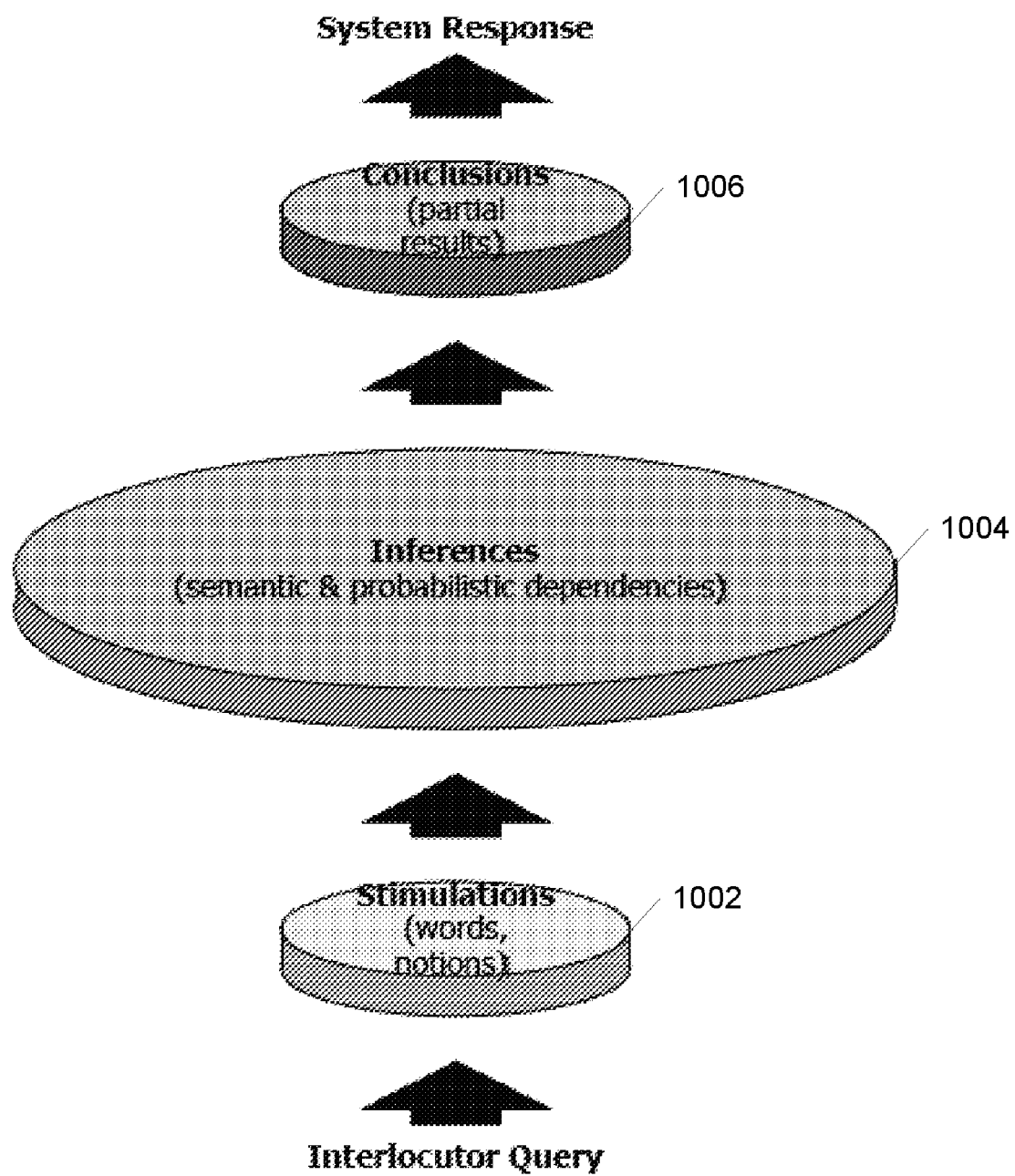
FIG. 10 is a diagram illustrating the process for generating a response using an inference knowledge base.

Referring to FIG. 10, the process for generating a response using an inference knowledge base is illustrated. As can be seem, a query is first broken down into stimulations, including words, notions, etc., at the notion level 1002. Inferences, including semantic and probabilistic dependencies can then be generated at the connections level 1004. Conclusions, e.g., partial results, can then be generated in the response level 1006.

Figure 11:
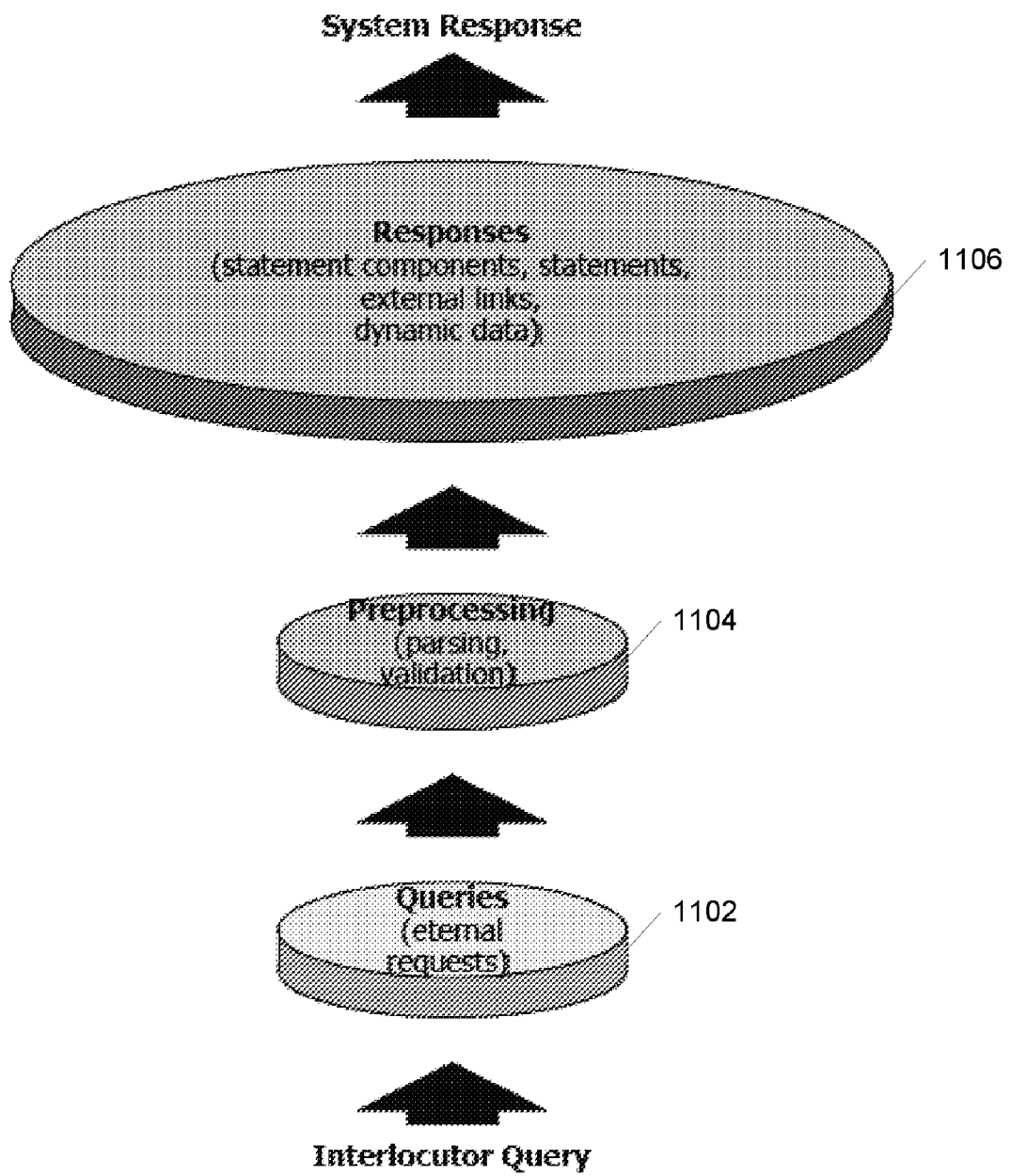
FIG. 11 is a diagram illustrating the process for generating a response using an external data source knowledge base.

FIG. 11 is a diagram illustrating the process for generating a response using an external data source knowledge base. As can be seen, a query is first broken down into external requests at the notion level 1102. Preprocessing including parsing a validation can then occur at the connections level 1104. Responses including statement components, statements, external links, dynamic data, etc., can then be generated at the response level 1106.

The character interface 102 can allow a user to communicate with system 100. As explained below, character interface can allow a user to communicate with system 100 using natural, humane language. Further, character interface 102 can provide a video or visual interface to system 100. Thus, a user can input, e.g., questions through character interface 102, which will in turn generate the input inquiries used by processing engine 104 to obtain information as described above. The information generated can then be output through character interface 102.

In certain embodiments, character interface 102 can be configured to provide a full featured, video character (avatar) on a web site. Character interface 102 can be configured to allow for displaying of video streams, enabling dialog using full sentences with voice synthesis (text2speech), which can enable user-friendly conversation presentation. Character interface 102 can also be configured to present content from: basic knowledge base 110 and/or client's knowledge base 108, Wikipedia content, RSS channels, and other internal or external sources 112 and 114 respectively.

Thus, character interface 102 can combines the displaying of video with the providing of text form different sources such as knowledge bases, RSS, Wikipedia, search engines, and with the ability to provide information, e.g., answers in a spoken voice. In other words, character interface 102 can closely emulate interactive, human interaction.

Again, depending on the embodiment, any web browser with, e.g., Adobe Flash plug-in can be used to access system 100 through character interface 102.

The character interface can be generated by filing an actor/actress performing a series of basic functions. For example, actor can be filed during short segments of speech, e.g., lasting for about 5 seconds. Other basic functions can include short pauses, e.g., during which the actor blinks or smiles, negative, or NO indications such as a shake of the head, affirmative, or YES indications such as a nod of the head, looks of laughter, anger, approval, etc.

These basic functions can then be woven together as needed to interact with a user using a visual module schema.

The following is a list of some example functions including descriptions and examples of each:

Synchronization talk—a speech lasting for about 5 seconds, it is best if the actor utters a neutral sentence, so that it is difficult to recognize the actual words form the lip movement. The resulting video can then be used in conjunction with any words. This function can have two variants:
  with gesticulation,
  without gesticulation.

stop—the actor stays still and, e.g., blinks their eyes. One blink can be sufficient.

waiting—sequences of awaiting for the user to take action that are played after N seconds (e.g. N=4) of user idleness. The frame at the beginning and at the end of the sequence can be the same so that they can be strung together in a more seamless fashion. These are sequences like:
  the actor waving their hand to the camera,
  "knocking" on the screen,
  juggling balls,
  drawing a picture, and
  taking off their wristwatch and showing it to the camera—here a zoom on the watch is possible—then putting the watch back on the wrist.

Affirmation "YES":
  Standard: nodding the head in affirmation, mouth form the word "YES", the hands kept together in the waist area, static;
  Standard gesticulation: nodding the head in affirmation, the mouth forms the word "YES", the hands arrangement while the head nods: the right hand moves vertically from up downwards, in affirmation, and then the hands return to the original position.

Negation "NO":
  Standard: head shaking in negation, mouth forms the word "NO", the hands kept together in the waist area, static;
  Standard+gesticulation: head shaking in negation, mouth forms the word "NO", hands arrangement while the head shakes, the right hand moves horizontally from left to right, in negation, and then the hands return to the original position.

Aversion, dissatisfaction—the actor utters exemplary sentences and gesticulation is possible, e.g.:
  "Oh, I don't like it when you refuse to talk to me!"
  "I'm sick and tired with this conversation!"
  "It makes me feel bad to hear you say so."

Smile—the head moves characteristically to a gentle laugh, bends slightly backwards, the mouth is smiling, the shoulders "open", the hands kept together in the waist area.

Laughter—head movement characteristic for long, hearty laugh, the head bends backwards, the mouth in laughter, the shoulders "open", the hands can split and move correspondingly to face expressions associated with laughter.

Eye wink—the head slightly leaning, the mouth smiling, the left eye winking gently, the hands kept together in the waist area.

Kiss—the head moves slightly forwards; the mouth forms a kiss, the eyes smiling; the hands kept together in the waist area.

Anger—the actor utters exemplary sentences, gesticulation is possible, e.g.:
  "You have no right to say so!",
  "Don't say that!",
  "I'll get you . . . "

Sadness—the head slightly leaning, the mouth expressing sadness, the shoulders bent forwards, the hands kept together in the waist area.

Cry—cry; the hands kept together in the waist area.

Amazement, outrage—the actor utters exemplary sentences, gesticulation is possible, e.g.:
  "What are you saying?!",
  "Don't swear!"

Ironical, mocking laughter—the head moves characteristically for gentle, ironic laughter; the mouth laughs ironically, the shoulders shrug slightly; the hands kept together in the waist area.

Sticking tongue out—the head bent slightly forwards, the tongue stuck out, the hands kept together in the waist area.

Yawning—the head slightly leaning; the mouth yawning, the eyes partly shut; one of the hands covers the open mouth, and then the hands return to the original position.

"Wow . . . "—the mouth forming the word "Oooo . . . "/"Wow . . . ", the face expresses astonishment, slight outrage; the hands gesticulate adequately.

"Hmmm . . . "—the mouth forming the word "Hmmm . . . ", the face expresses pondering, the hands gesticulate adequately.

Once the above behaviors are captured, they can be used in conjunction with a movie plan and a visual model scheme to generate a character interface, or interactive avatar. The visual aspects of the character interface can be combined with input and output voice capabilities described above to produce the interactive visual avatar.

Figure 12A:
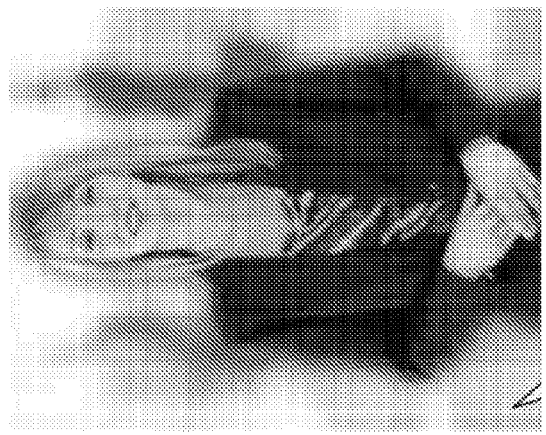
FIGS. 12A-12C are diagrams illustrating an example movie plan in accordance with one embodiment.
Figure 12B:
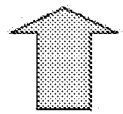
Figure 12B:
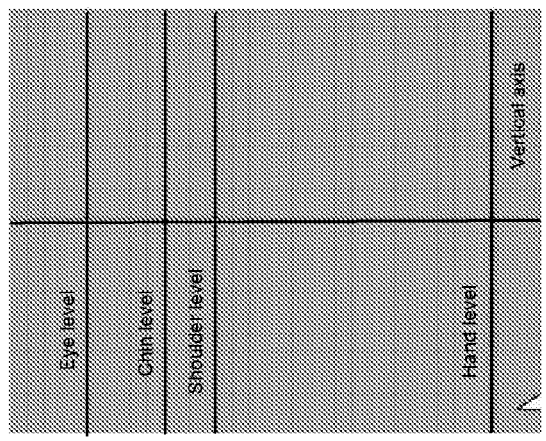
Figure 12C:
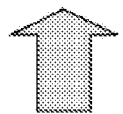
Figure 12C:
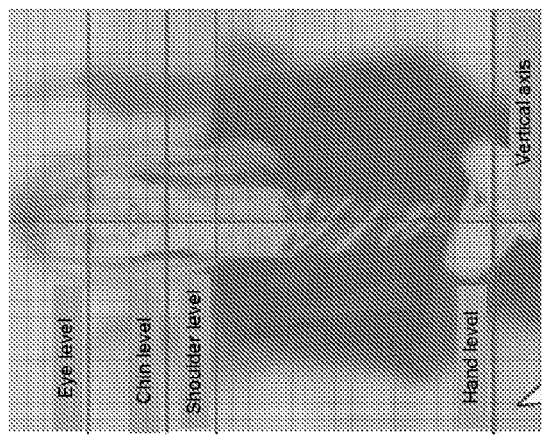

FIGS. 12A-C are diagrams illustrating an example movie plan in accordance with one embodiment. In this example, the movie plan uses a display frame for depicting an actor/an actress from the waist up. As illustrated in FIG. 12B, the movie plan can be based on a "greenbox" background that defines certain areas. For example, in FIG. 12B, the red lines indicate levels that are important in joining sequences that involve various movements and body parts, such as eyes, chins, shoulders or hands. Thus, the red lines define areas that generally contain these body parts as well as a vertical axis. AS noted above, various sequences can be strung together and it is important that the sequencing be as seamless as possible to the user. The beginning and ending of various sequences will therefore be merged merge, and it is important that the whole image, especially the position of the head and hands, are identical or almost identical in the beginning and the ending of the sequence. The movie plan of FIGS. 12A-C can be used to help ensure the proper alignment for sequencing.

Figure 13B:
FIGS. 13A-13C are diagrams illustrating an example visual module scheme in accordance with one embodiment.
Figure 13A:
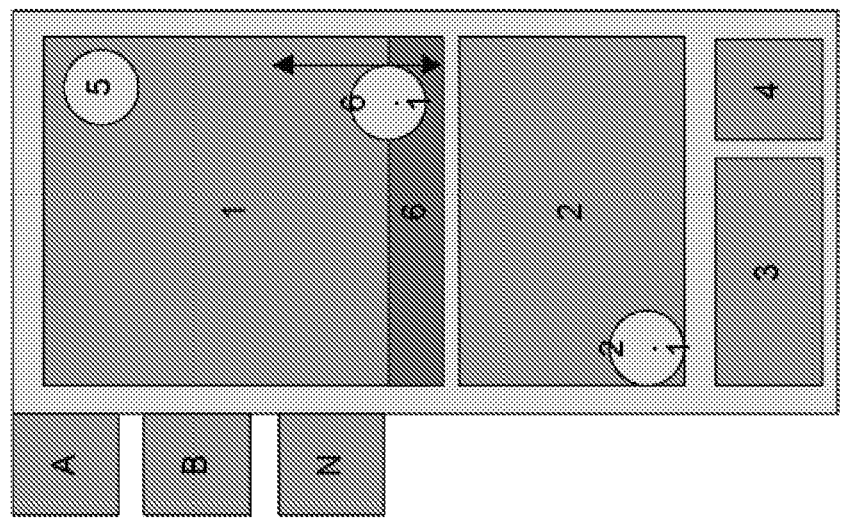
Figure 13C:
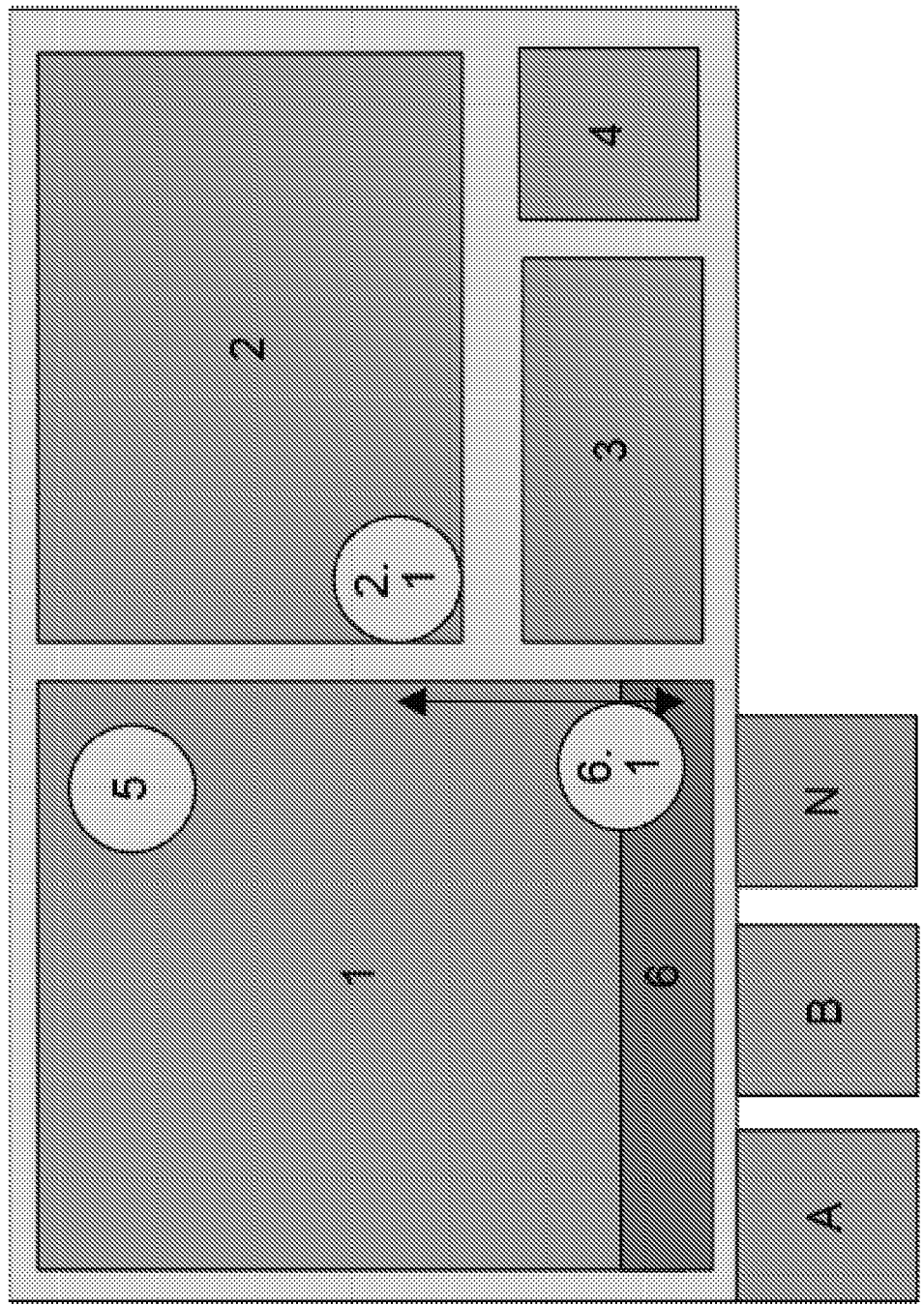

The example visual module scheme of FIGS. 13A-C can then be used to present the character interface. The various number areas of FIGS. 13A-C are described in detail in the following paragraphs.

In this example, the area designated as (1) is where the video/animation sequences can be displayed. Two kinds of visualization can be possible: video and 2D. Depending on the kind of visualization, character interface 102 illustrated in FIGS. 12A-C can be configured to display the character using a corresponding built-in engine.

For a video based character, it can be assumed that system 100 feeds the module with information about the set of sequences that are to be displayed along with the currently presented sentence. For example, it can be assumed that a maximum number of sequences is three: one before the current statement, one during the statement and one after the statement. The minimum number of sequences can be one, which will be displayed during the statement. Character interface 102 can be configured to assure the sequences are joined in real time. Additionally, character interface 102 can be configured to synchronize the duration time of a given sentence with the length of the current statement and the duration of an audio file, such as an mp3 file.

Video sequences can be used. For example, two types of sequences can be used in certain embodiments:
  basic: any number of "talk synchronization", any number of "stop", any number of "wait"; and
  extended (to be used mainly at the beginning and at the end of the statement): "affirmation yes", "affirmation yes gesticulation", "negation no", "negation no gesticulation", "aversion dissatisfaction", "smile", "laughter", "wink", "kiss", "anger", "sadness", "cry", "amazement outrage", "laughter", "ironical mocking", "sticking tongue out", "yawning", "wow", and "hmmm".

For a 2D character interface, similar assumptions can be used as described in relation to the video interface. By using a vector avatar, the character interface 102 can be configured to synchronize mouth movement with the uttered sentence better than in the case of a video stream character interface. Apart from the scheme presented in the video module description, it is also possible to synchronize the avatar's mouth movement exactly to phonemes building the statement.

Additional functions of a video or 2D interface can include: in the time between reading one statement and reading another one, the module plays STOP sequence, and the interface 102 measures the duration of the STOP sequence and, if a defined value is exceeded, a randomly chosen (with exclusion of the last played one) WAIT sequence can be displayed.

Additional functions that can be specific to a 2D character interface can include: following the mouse pointer with the avatar's eyes, other "funny actions" defined as a kind of "hot-spots" on the avatar, e.g., the mouse pointer hovering over those spots will trigger certain animation. For example, animated sneezing when the pointer hovers over the avatar's nose. It should be noted that in most embodiments, only the STOP sequence can contain "hotspots".

The area designated as (2) is the text area where the Assistant's statements, web links and suggested responses can be displayed. In certain embodiments, the area can be configured to predict its own mode of displaying and presenting data. Types of objects of content display modes can include: a statement, i.e., a set of letters, an image, i.e., pictures embedded within a statement, bullets, etc., links to other websites, i.e., URL addresses, and other types of objects.

For each type of object a change in visualization of the mouse pointer over it, or a change the characteristic behavior of the object (e.g. specific animation) can be possible.

The "Back" button (2.1) can cause the return to the sentence previously displayed.

The area designated as (3) can be a text area where the user can input their statement/question. This area can be configured to enable the user to input, using the keyboard, a question to system 100. The user can be allowed to accept an entered sentence, e.g., by pressing an "Enter" key or selecting the Accept button (4).

The "Audio on/off" button (5) can comprise a "checkbox" button that when selected results in the avatar's voice being audible, when it is deselected, then the avatar's voice can be muted.

The area designated as (6) can comprise a newsticker for RSS aggregated news that can be displayed contextually depending on the current topic of the conversation. For example, area (6) can comprise a bar with scrolling news. The character interface 102 can receive a signal from processor 104 indicating that there is an RSS channel connected to the current statement. This can cause character interface 102 to activate the newsticker. Additionally, the ticker can be used as a kind of advertisement space. In certain embodiments, a double-click on the newsticker can open the RSS channels tab (marked "B" on the scheme) and present the RSS channel as an article.

The "Display/Hide RSS" button 6.1 can be used to expand the RSS ticker (6) into the whole visualization area (1), when the character interface is displayed in the mode without tabs A, B . . . N.

The Wikipedia tab (A) will expand when clicked to display information from Wikipedia. This information can be downloaded through: the processing engine 104 if the user, during the conversation, types in a question like: "Show me information about Madonna", the engine will download the information from Wikipedia, automatically open tab "A" and display the information to the user; or directly through the character interface 102 if the user opens the tab and types in, e.g., "Madonna", the information can be downloaded directly from Wikipedia and can be processed by the system 100.

The RSS channels tab (B) can allow access to information that can be accessed through: the processing engine 104 if the user, during the conversation, types in a question that is connected to one of the RSS channels, e.g. "What's the weather like today?", the engine will respond with a statement and the URL of the RSS feed and automatically display the feed in the newsticker (6). If the amount of data requires it, tab "B" can be automatically expanded and the feed is displayed in it; or directly through character interface 102 if the user opens the tab and chooses an RSS channel from the list (marked B 3).

The list of available RSS channels can be defined by system 100.

The tab marked (N) can be a placeholder for new tabs to be added. The placeholder can allow for adding another tab, defining its form of content presentation and data source. The "Close tab" button (A/B 1), can be configured to minimize the tab.

The area designated as (A/B 2) can be a text area for displaying, e.g., a chosen Wikipedia article or RSS channel. Area (A/B 2) can be configured to predict its own mode of displaying and presenting data. The object types that should be considered when coding custom mode of content presentation include: a statement—a set of letters, an image, e.g., pictures embedded within a statement, bullets, links to other websites, e.g., URL addresses.

In certain embodiments, each type of object will trigger mouse pointer change when it hovers over that object.

The area designates (A3) can be a text area configured to allow the user to query Wikipedia directly. For example, the user can input, e.g., with a keyboard, a Wikipedia query. The user can accept the input by pressing "Enter" or clicking on button (A4).

(B3) can be a list of defined links to RSS channels.

The "Accept" button (A4) can be used to accept the user input from field (A3).

Figure 14B:
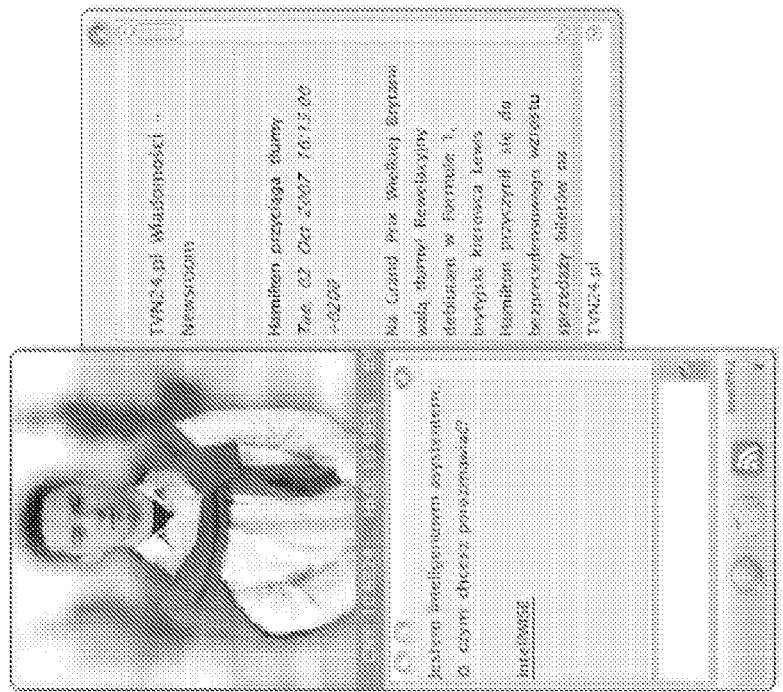
FIGS. 14A and 14B are a diagram and screen shot illustrate an example prototype visual module scheme versus an actual implementation of the scheme.
Figure 14A:
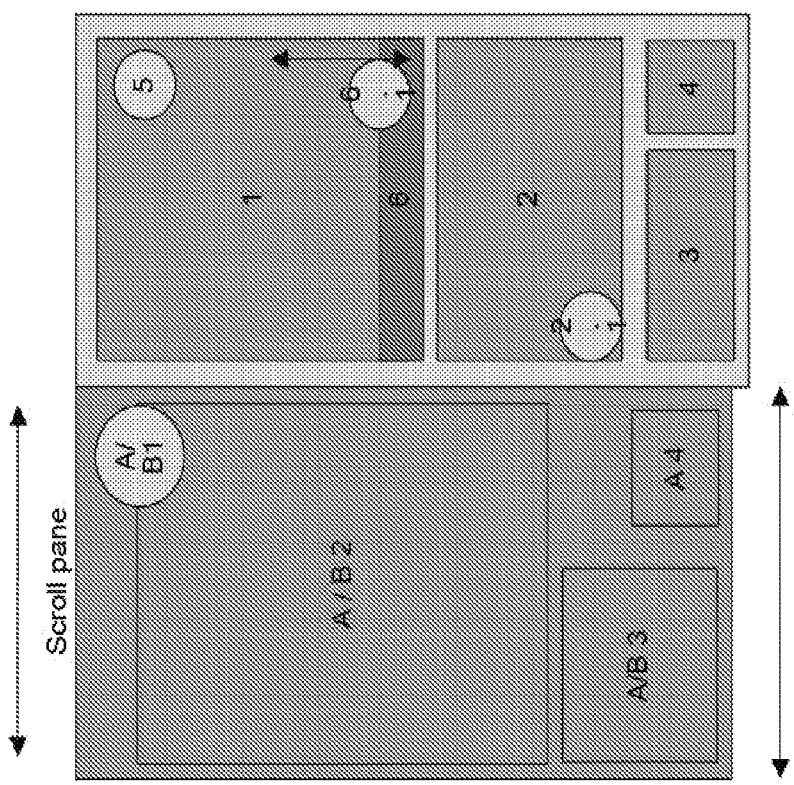

FIGS. 14A and 14B illustrate an example prototype visual module scheme (14A), such as those illustrated and described above, versus an actual implementation of the scheme (14B).

Figure 15:
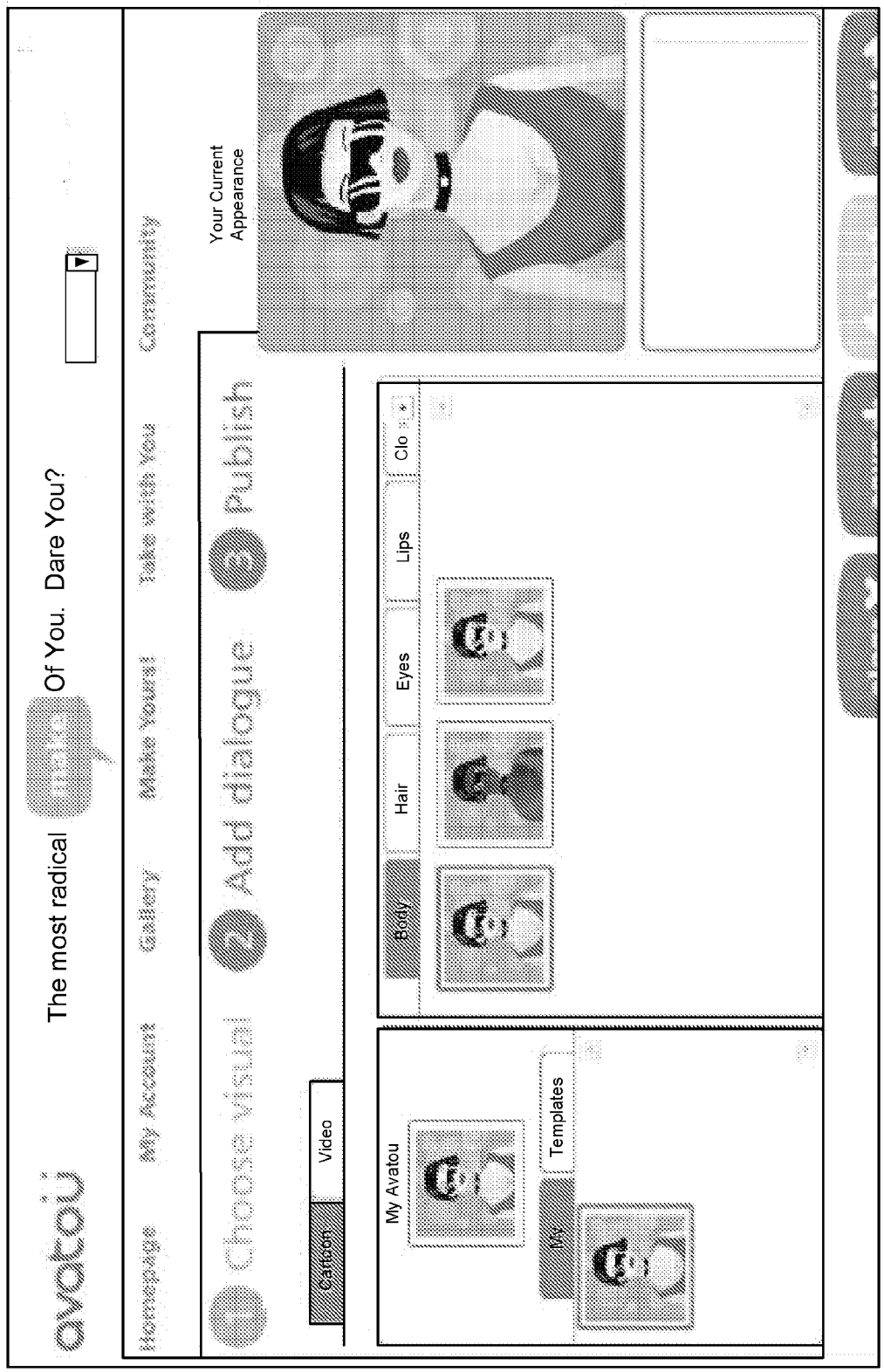
FIG. 15 is a screen shot illustrating an example screen that can be presented to a user creating their own cartoon character avatar for use with the system of FIG. 1.
Figure 16:
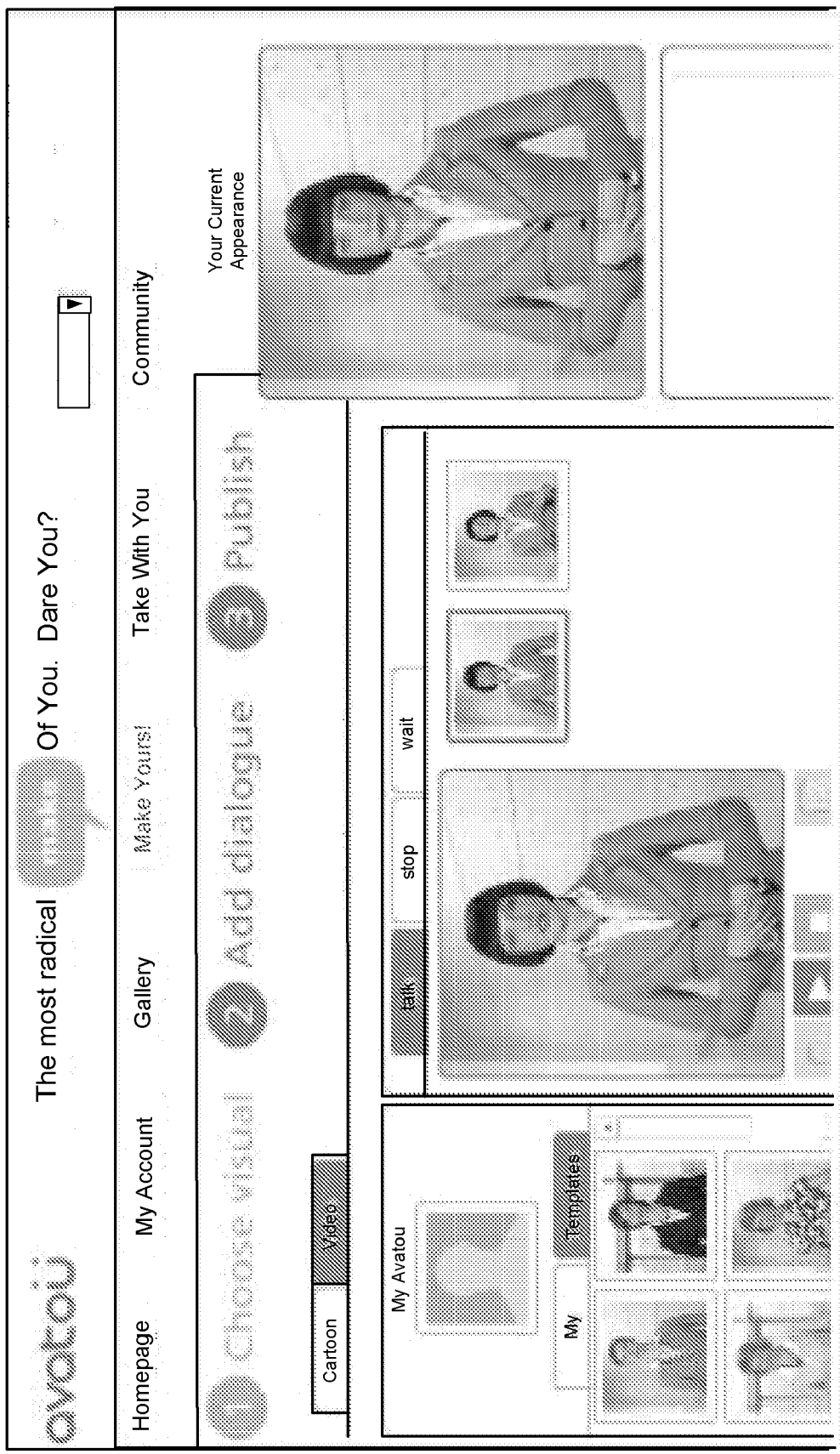
FIG. 16 is a screen shot illustrating an example screen that can be presented to a user creating a ready made video character avatar for use with the system of FIG. 1.

System 100 can be configured to allow users to access the system and create their own avatars, or character interfaces 102. For example, FIGS. 15 and 16 are screen shots illustrating an interface that can be presented via system 100 to a user when the user is designing their avatar. The screen illustrated in the screen shot of FIG. 15 can be presented when the user chooses a ready made cartoon character, while the screen illustrated in FIG. 16 can be presented when the user chooses a ready made video character.

System 100 can present the tools need to create the appearance of the avatar as well as to configure the dialogue capability of the avatar. Further, while ready made characters can be used, the user can, in certain embodiments, create their own characters.

As illustrated in FIGS. 15 and 16, the user can click the "Make yours" tab in order to start the process of designing an avatar. The user can then select whether they desire to design a cartoon or a video character. If the user wants to design a ready made character, they can then clink on the template tab to bring up ready made characters and videos. If on the other hand, the user wants to make their own cartoon character, then the user can use the tabs to choose, e.g., the body, hair, eyes, lips, clothes, gadgets, background, etc., as illustrated in FIG. 15.

As illustrated in FIG. 16, if the user selects a ready made video character, then they can view the ready made sequences, e.g., for talk, stop and wait. If on the other hand, the user wants to make their own video character, then they will need to record video sequences for, e.g., the talk, stop and wait sequences. Depending on the embodiment, more or less sequences may be required and in some embodiments, the user can select some sequences at first and then select others later if desired.

In certain embodiments, a camera will need to be interfaced with a computer being used by the user to create the avatar. In fact, system 100 can be configured to automatically detect the presence of a camera.

The length of the recorded sequences can depend on the requirements of a particular embodiment. For example, in one example embodiment, the recordings should be of a length between about 3 seconds on the low end and about 30 seconds on the high end.

Next, the user can design, or build the dialogue capabilities of the avatar. In certain instances, the user can simply edit a ready made dialogue. In other embodiments, the user can select form ready-made dialogue categorized into types including greetings, Blogs, auctions, dating, mottos, and jokes to name a few. The user can also choose the language of the dialogue.

In still other embodiments, the user can use advanced features to create new dialogues from scratch. In certain embodiments, these dialogues can be bases on an existing dialogue scheme and controlled using floating information.

Figure 17:
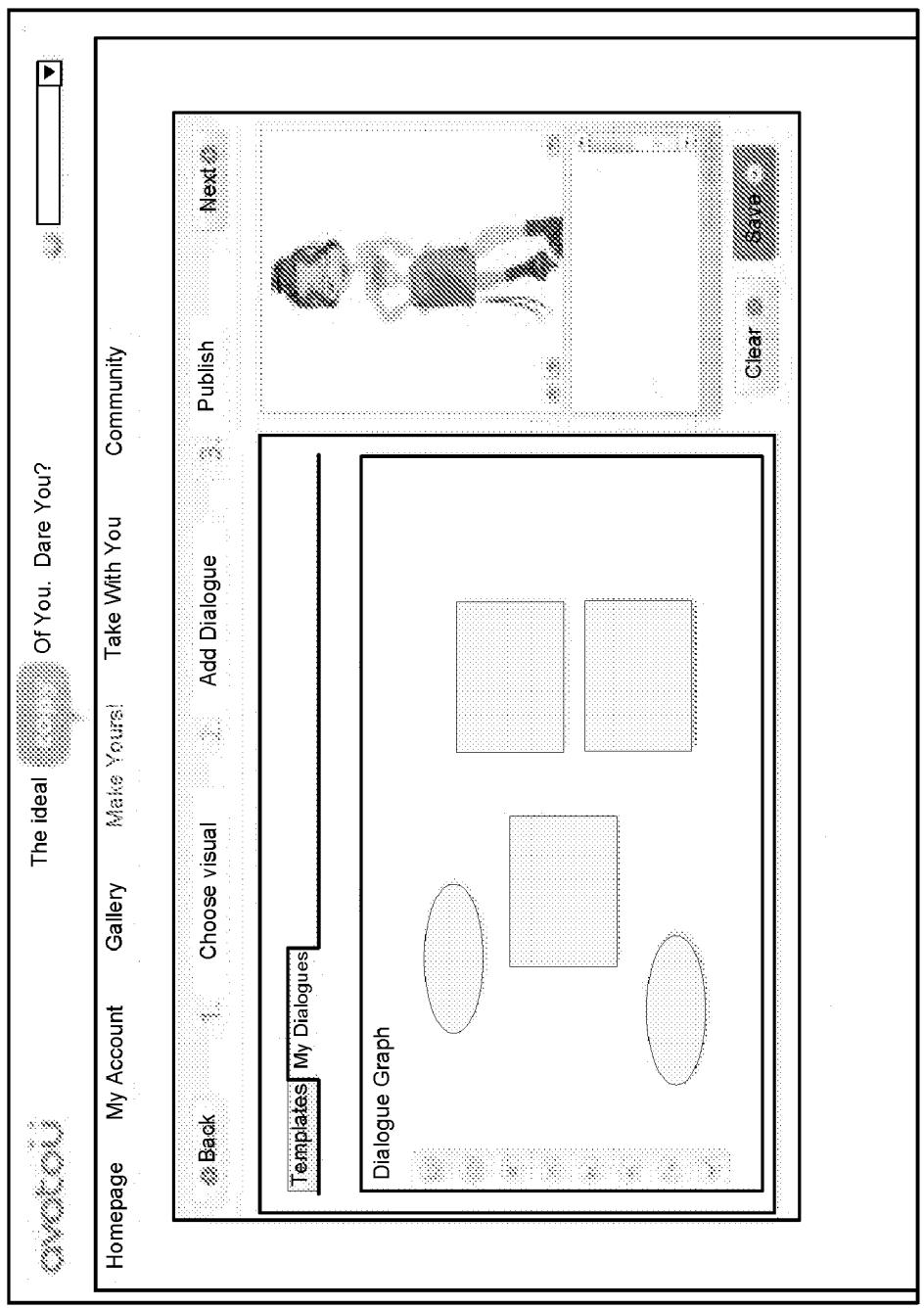
FIG. 17 is a screen shot illustrating a screen that can be present to a user for creating a dialogue for an avatar created using the tools illustrated in FIGS. 15 and 16.

The process of building a dialogue is illustrated in FIG. 17, which also illustrated a portion of an example dialogue.

Finally, speech can be added to the avatar either using a text to speech converter and speech synthesizer or by actually recording audio files, such as MP3 files.

The configuration interface 116 can be used by an administrator to configure character interface 102 and processing engine 104. Configuration interface 116 can be configured to present a series of screens that the administrator can use to define the various knowledge layers and the configurations, structures, searches, visualizations, etc. related thereto.

Figure 18:
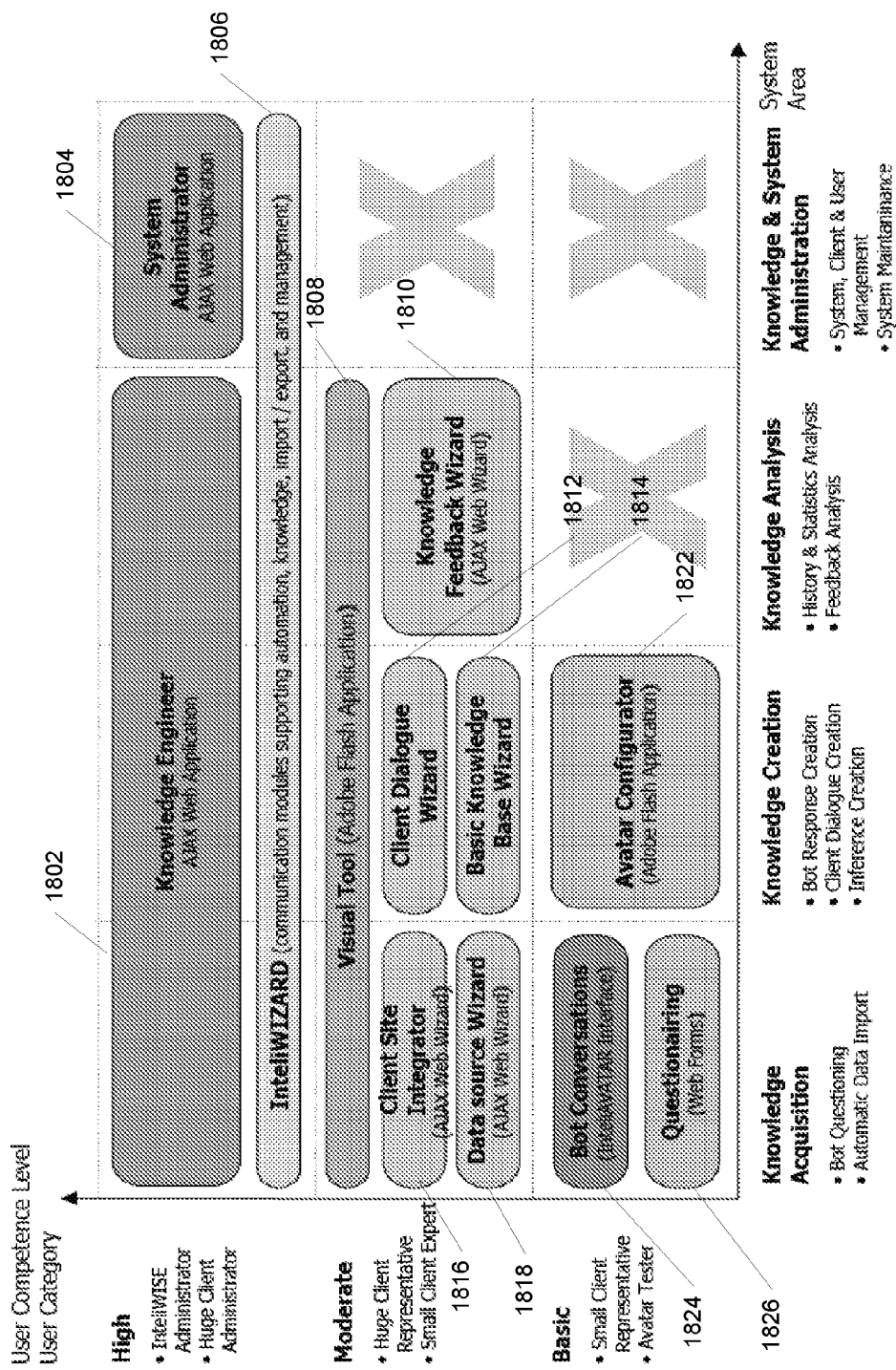
FIG. 18 is a diagram illustrating the components that make up a configuration interface included in the system of FIG. 1 in accordance with one embodiment.

FIG. 18 is a diagram illustrating the example components that can, depending on the embodiment, comprise configuration interface 116. As can be seen, configuration interface 116 can comprise a knowledge engineer, which is described more fully with respect to screen shots 19-40, a system administrator 1804, an inteliwizard module 1806 that can provide communication modules that support automation, knowledge modules, import/export modules, and management modules, a knowledge feedback wizard 1810, a client dialogue wizard 1812 that can be configured to enable configuration of the interface between a user and character interface 102, a basic knowledge base wizard that can be configured to allow configuration of basic knowledge database 110, client site integrator 1816, data source wizard 1820, avatar configurator 1822 that can be configured to allow configuration of character interface 102, e.g., as described above, Bot conversations configuration module 1824 that can be described to configure Bots included in processing engine 104 as described above, and a forms module 1826.

Figure 19:
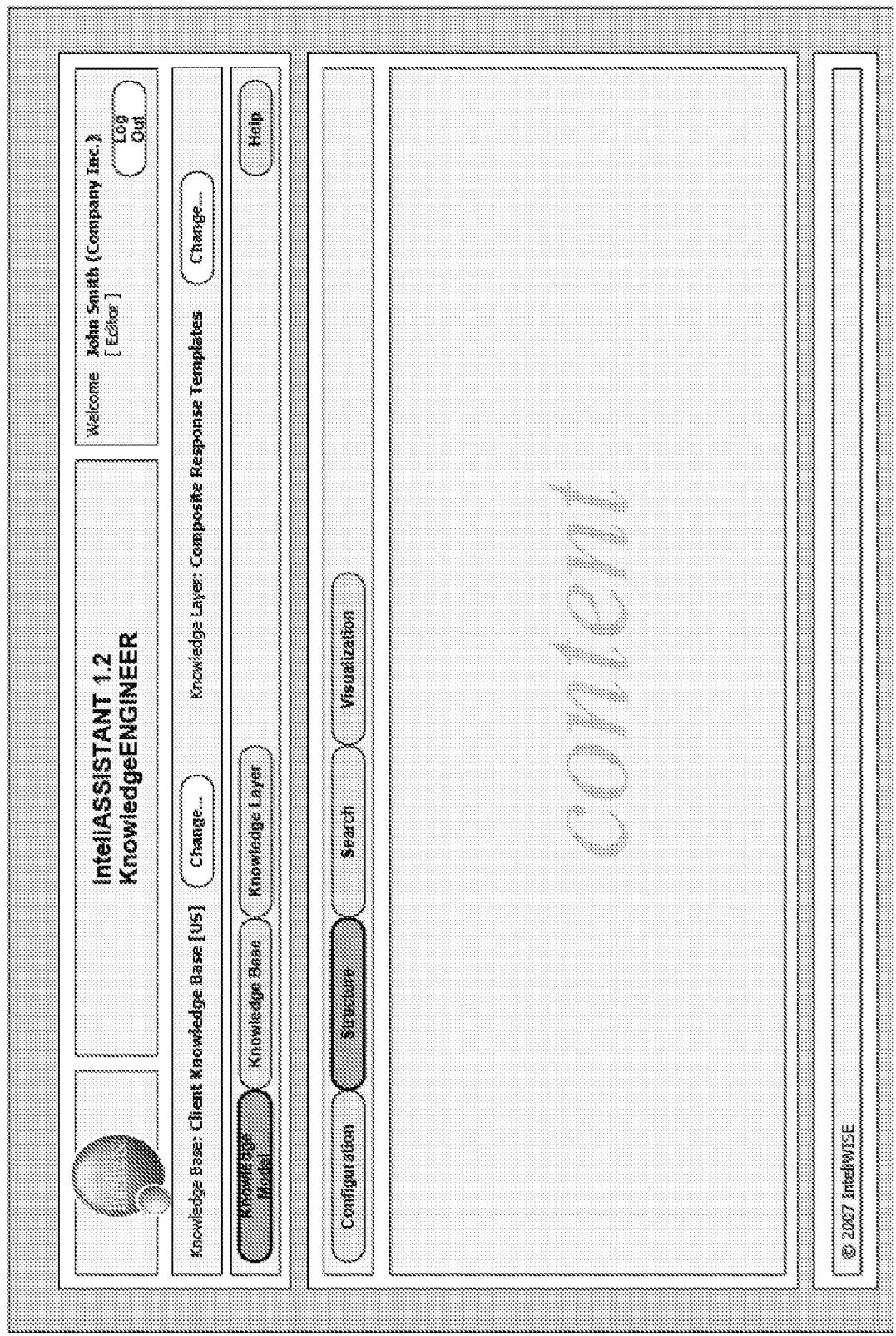

As illustrated in the screen shot of FIG. 19, when an administrator accesses knowledge engineer 1802 they can be presented with a screen that allows them to configure the knowledge model and knowledge bases and layers that make up the module. This configuration can include several steps including, as in the example of FIG. 19, configuration, structure, search, and visualization.

Figure 20:
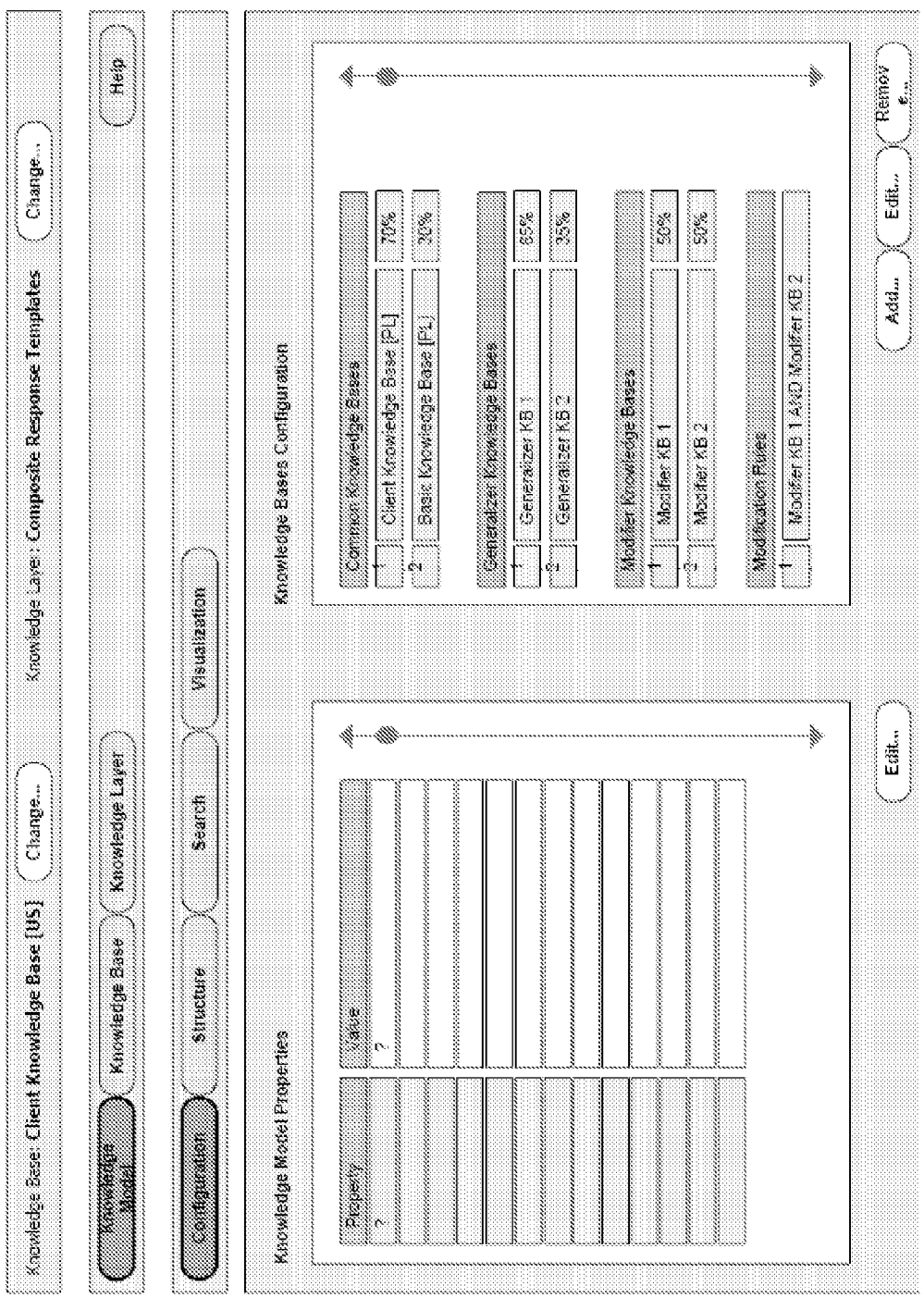

As illustrated in the screen shot of FIG. 20, the administrator can select knowledge model and configuration and be presented with a screen that allows the user to define knowledge model properties and the weighting of the various database sources that are used by the knowledge bases and rules that make up the knowledge model.

Figure 21:
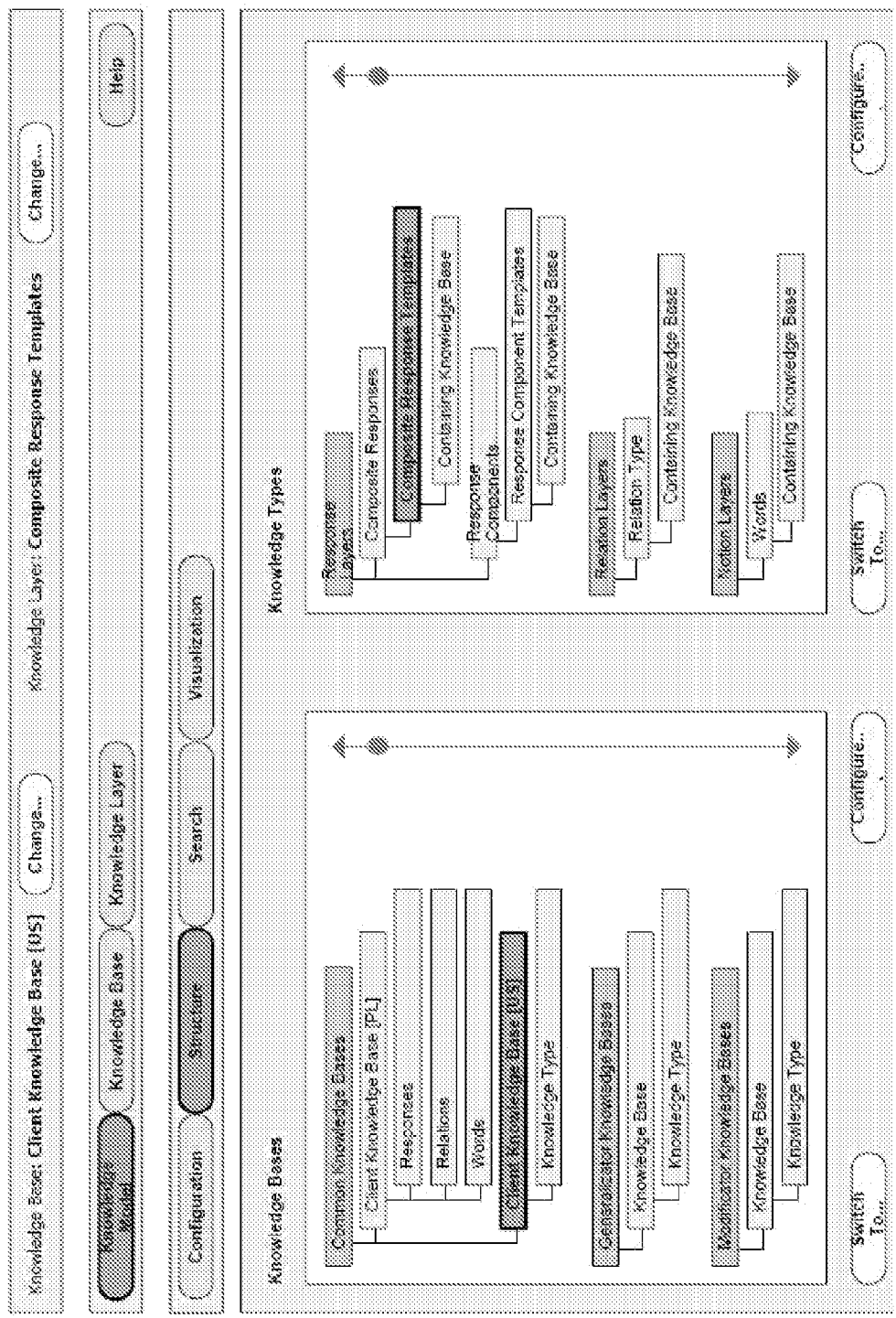

As illustrated in the screen shot of FIG. 21, the administrator can then select knowledge model and structure and be presented with a screen that allows the user to define the structure of the knowledge bases and types that make up the knowledge model.

Figure 22:
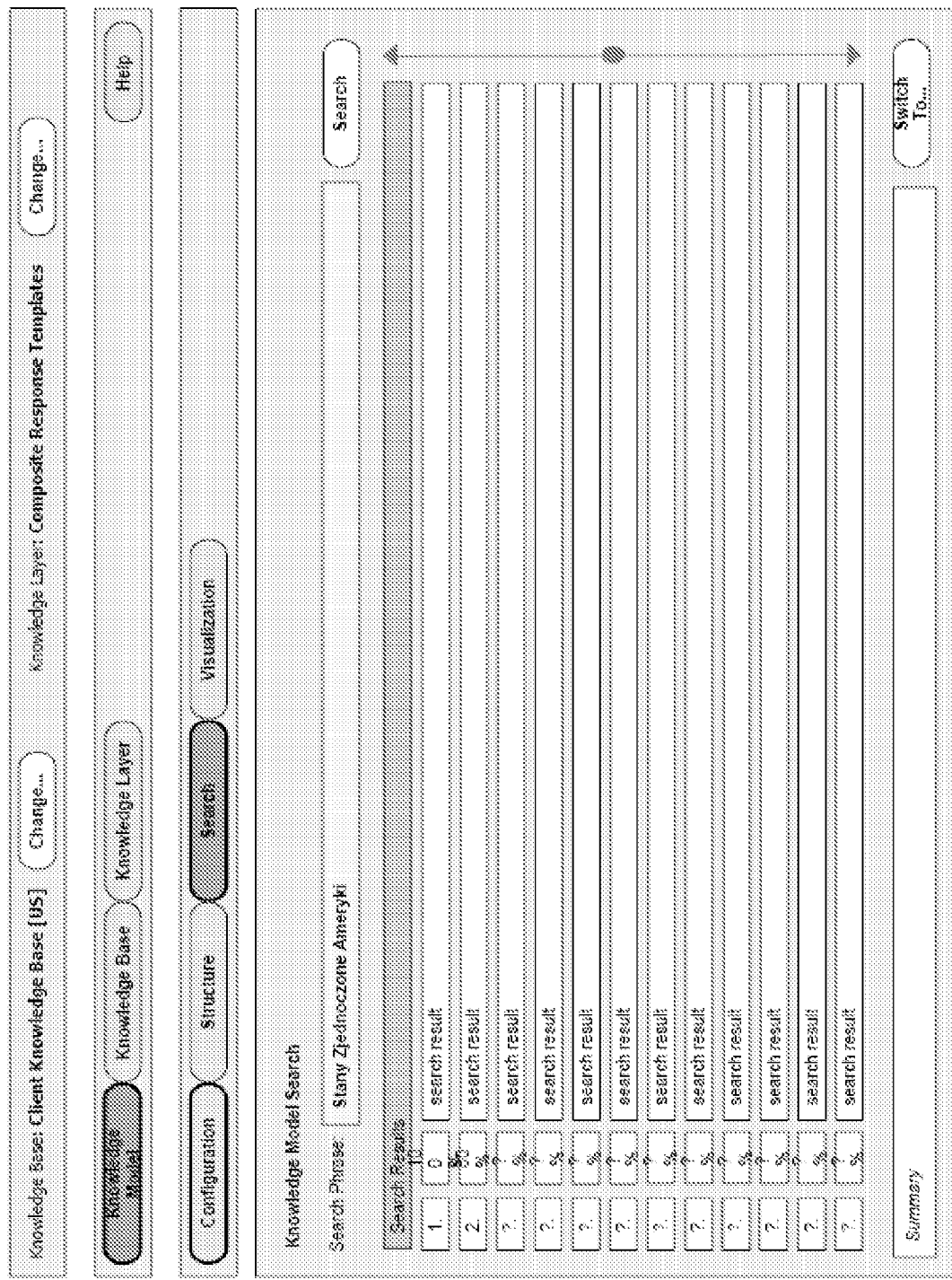

As illustrated in the screen shot of FIG. 22, the administrator can then select knowledge model and search and be presented with a screen that allows the user to define how search results will be presented.

Figure 23:
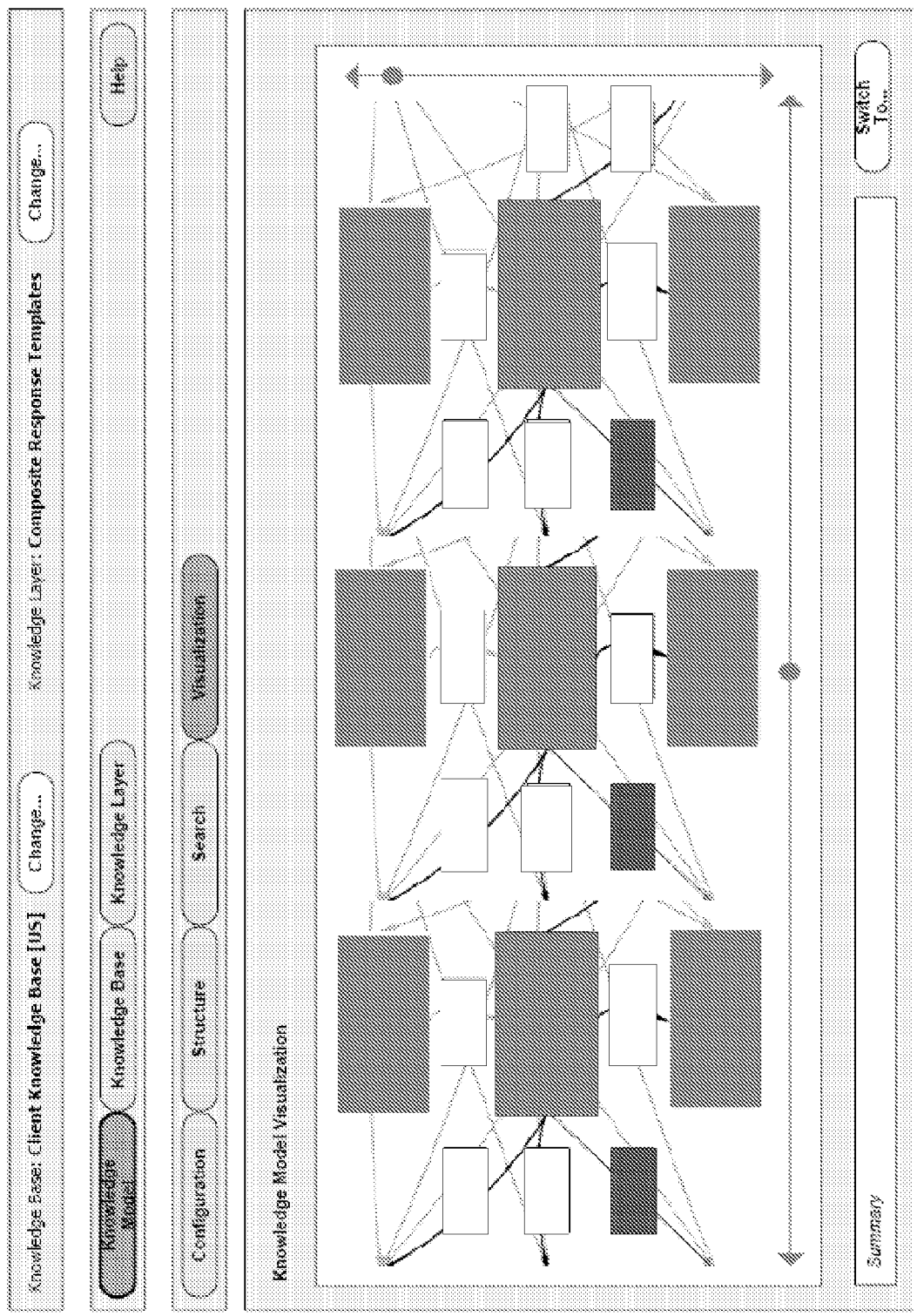

As illustrated in the screen shot of FIG. 23, the administrator can then select knowledge model and visualization and be presented with a screen that allows the graphically illustrates the knowledge model.

Figure 24:
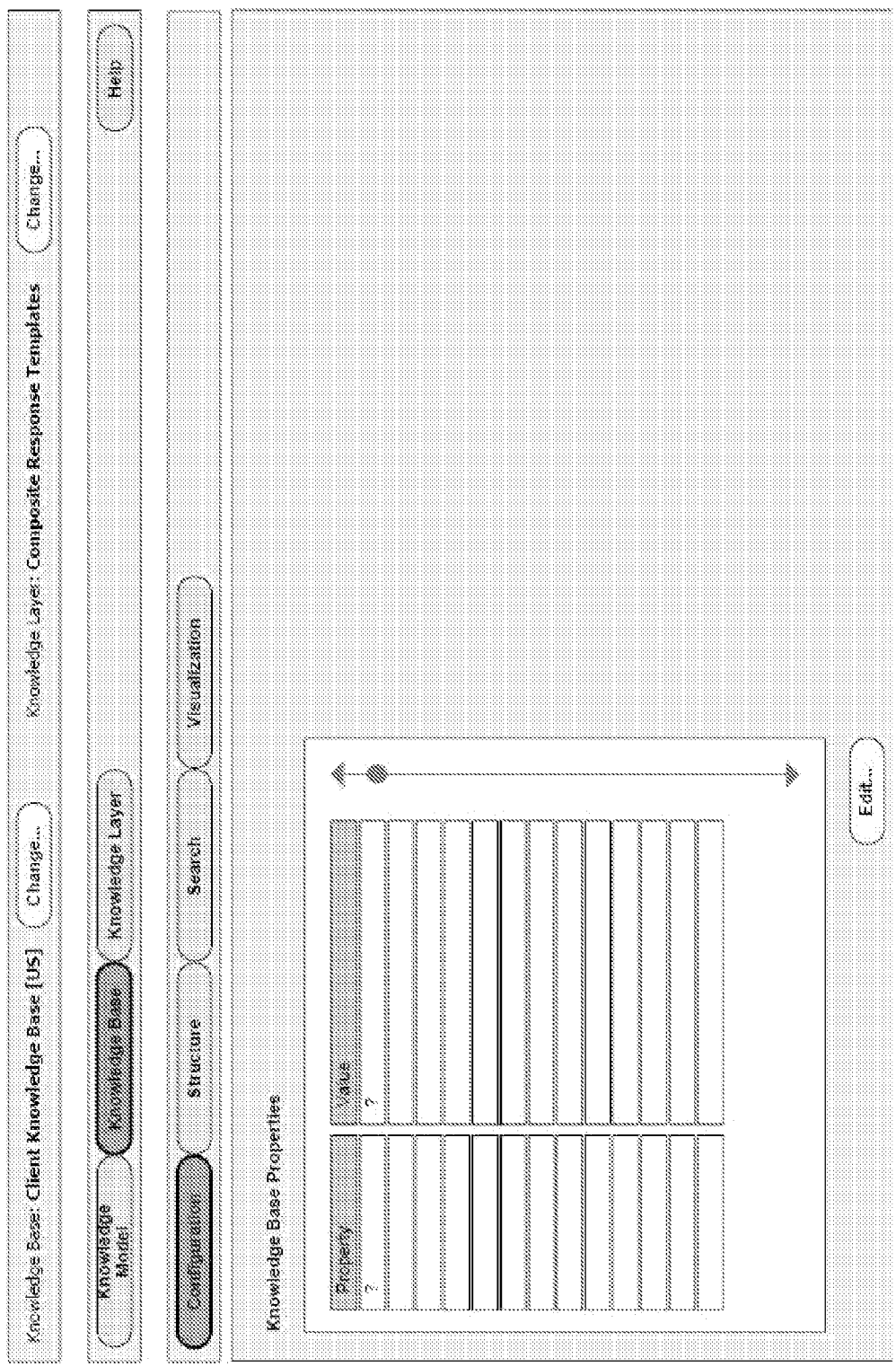

As illustrated in the screen shot of FIG. 24, the administrator can select knowledge base and configuration and be presented with a screen that allows the user to define knowledge model properties that make up the knowledge base.

Figure 25:
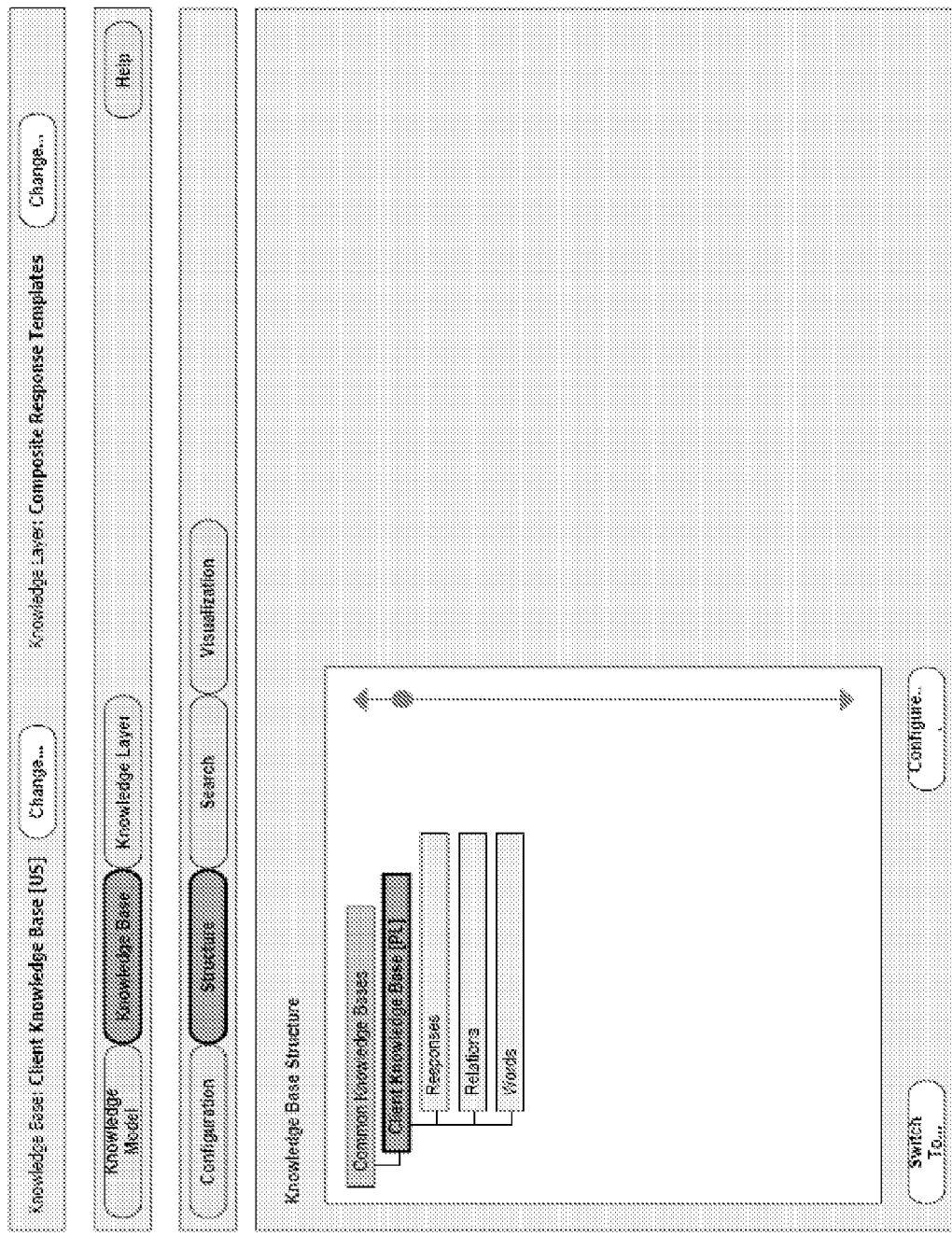

As illustrated in the screen shot of FIG. 25, the administrator can then select knowledge base and structure and be presented with a screen that allows the user to define the structure of the knowledge base.

Figure 26:
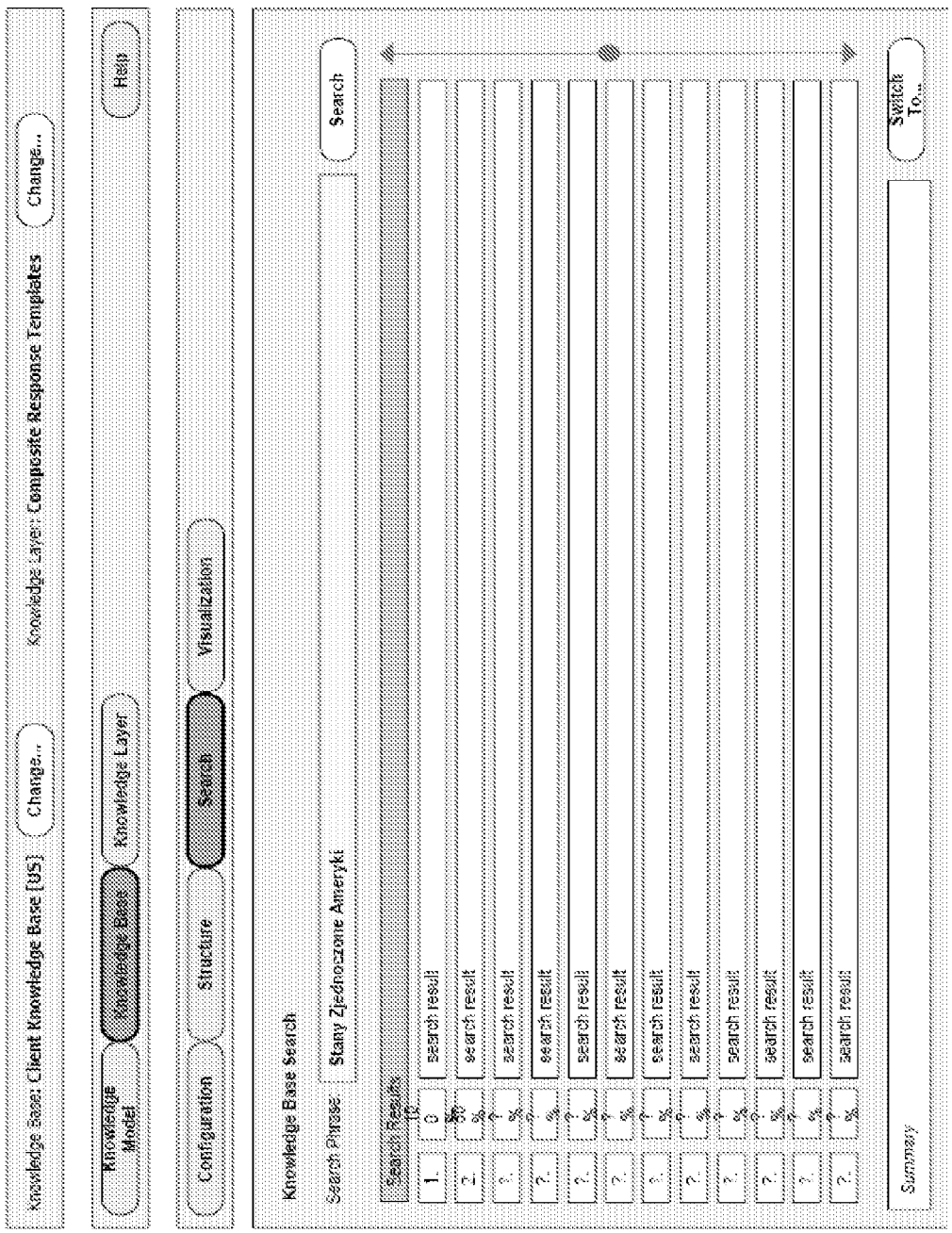

As illustrated in the screen shot of FIG. 26, the administrator can then select knowledge base and search and be presented with a screen that allows the user to define how search results will be presented.

Figure 27:
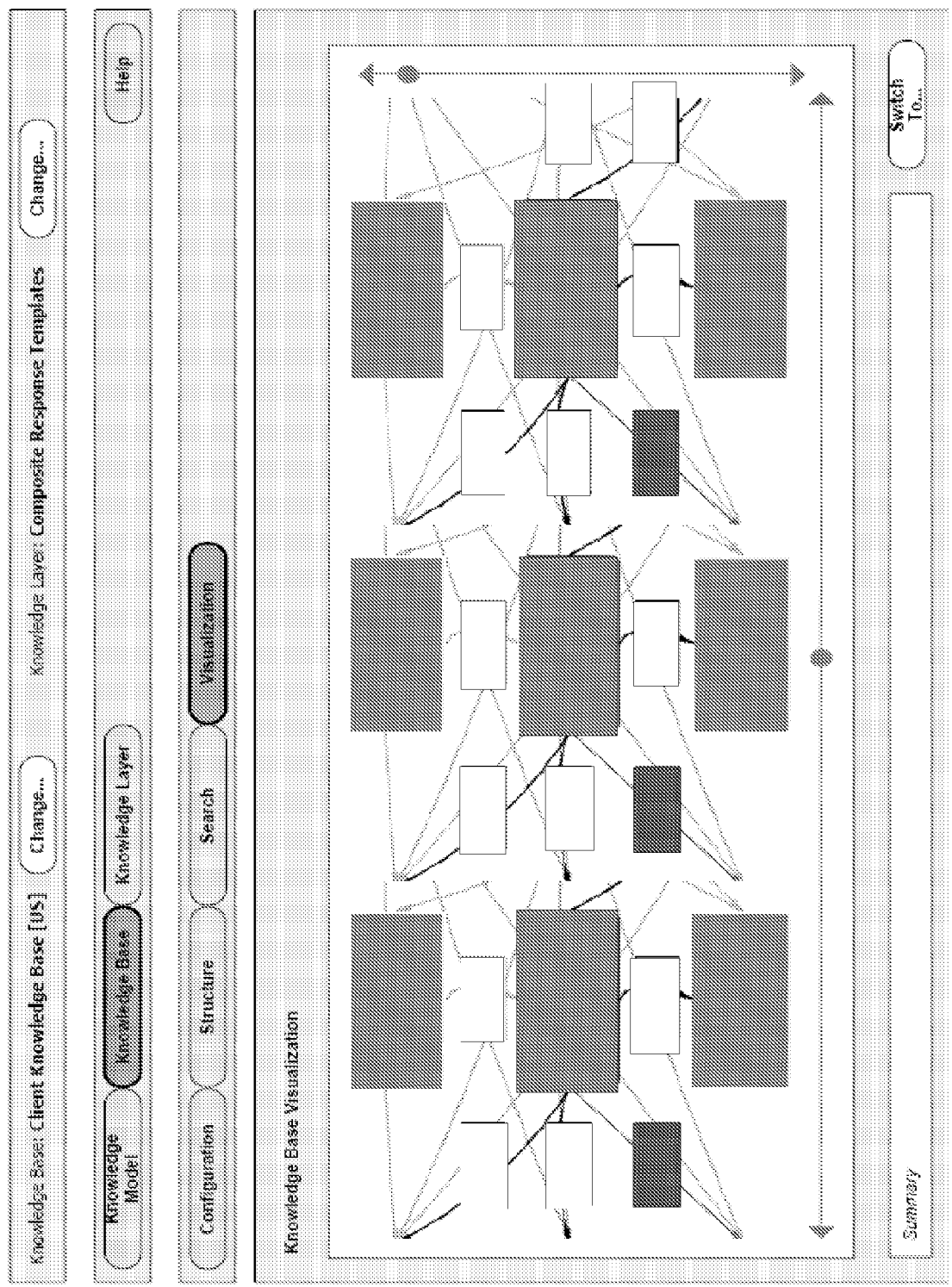

As illustrated in the screen shot of FIG. 27, the administrator can then select knowledge base and visualization and be presented with a screen that allows the graphically illustrates the knowledge model.

Figure 28:
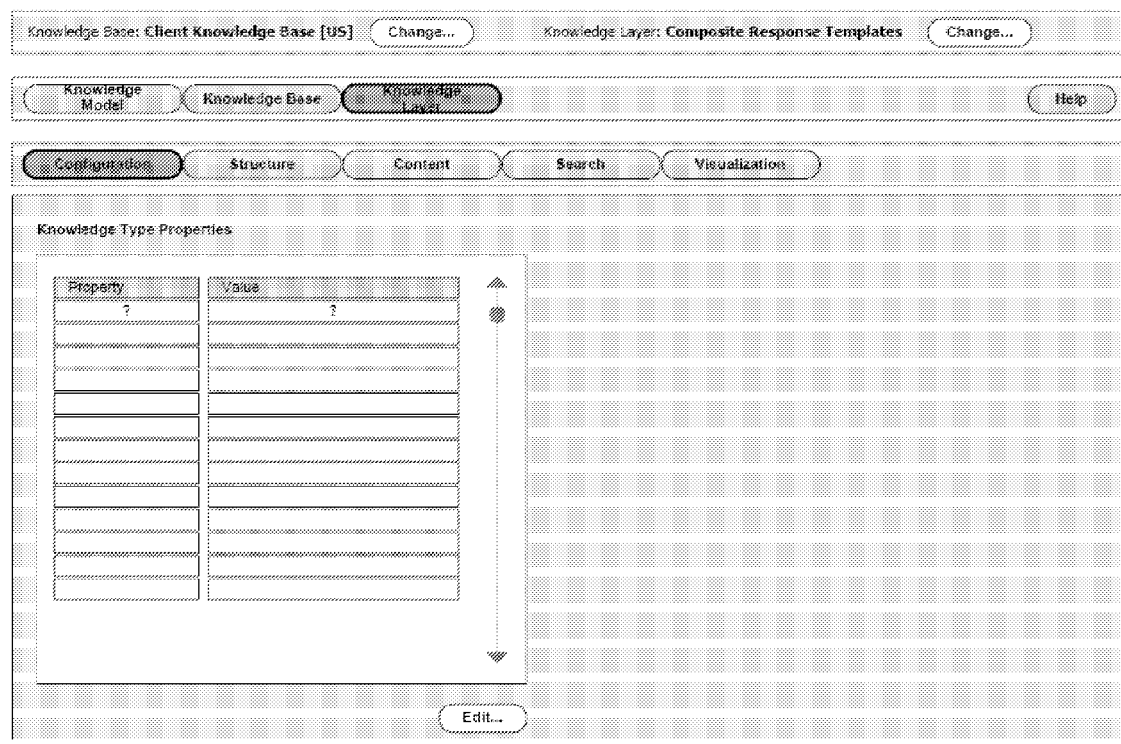

As illustrated in the screen shot of FIG. 28, the administrator can select knowledge layer and configuration and be presented with a screen that allows the user to define knowledge type properties that make up the knowledge layer.

Figure 29:
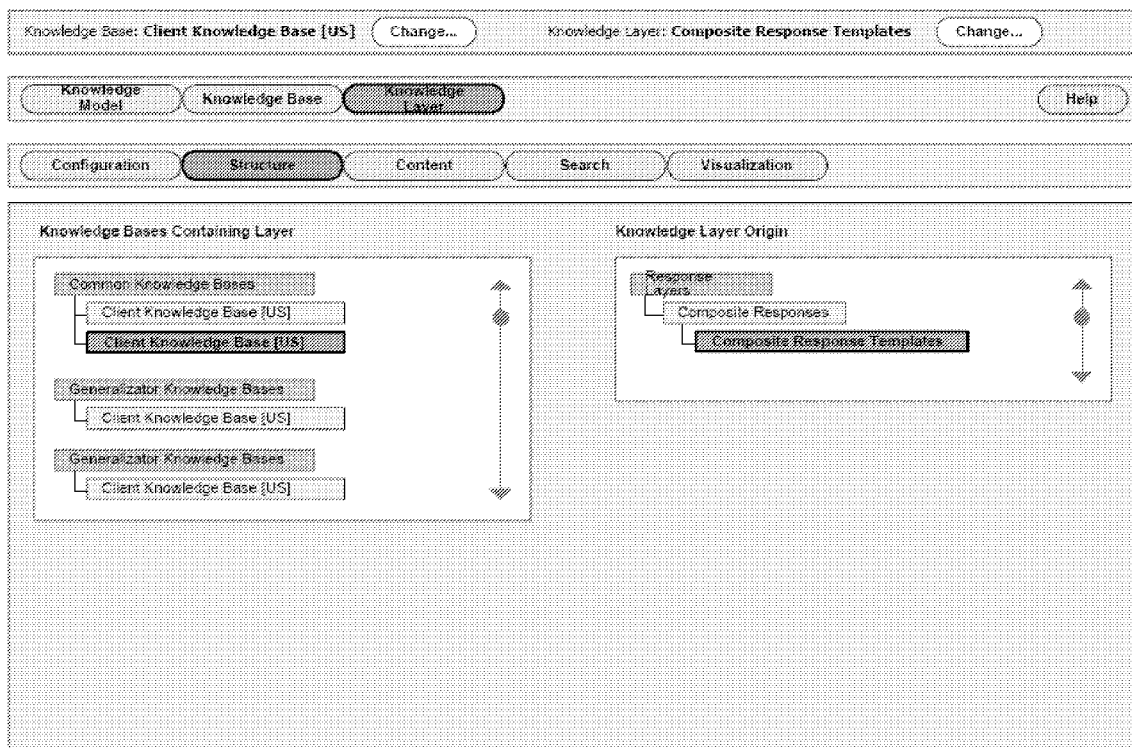

As illustrated in the screen shot of FIG. 29, the administrator can then select knowledge layer and structure and be presented with a screen that allows the user to define the structure of the knowledge bases containing the layer and the origin of the layer.

Figure 30:
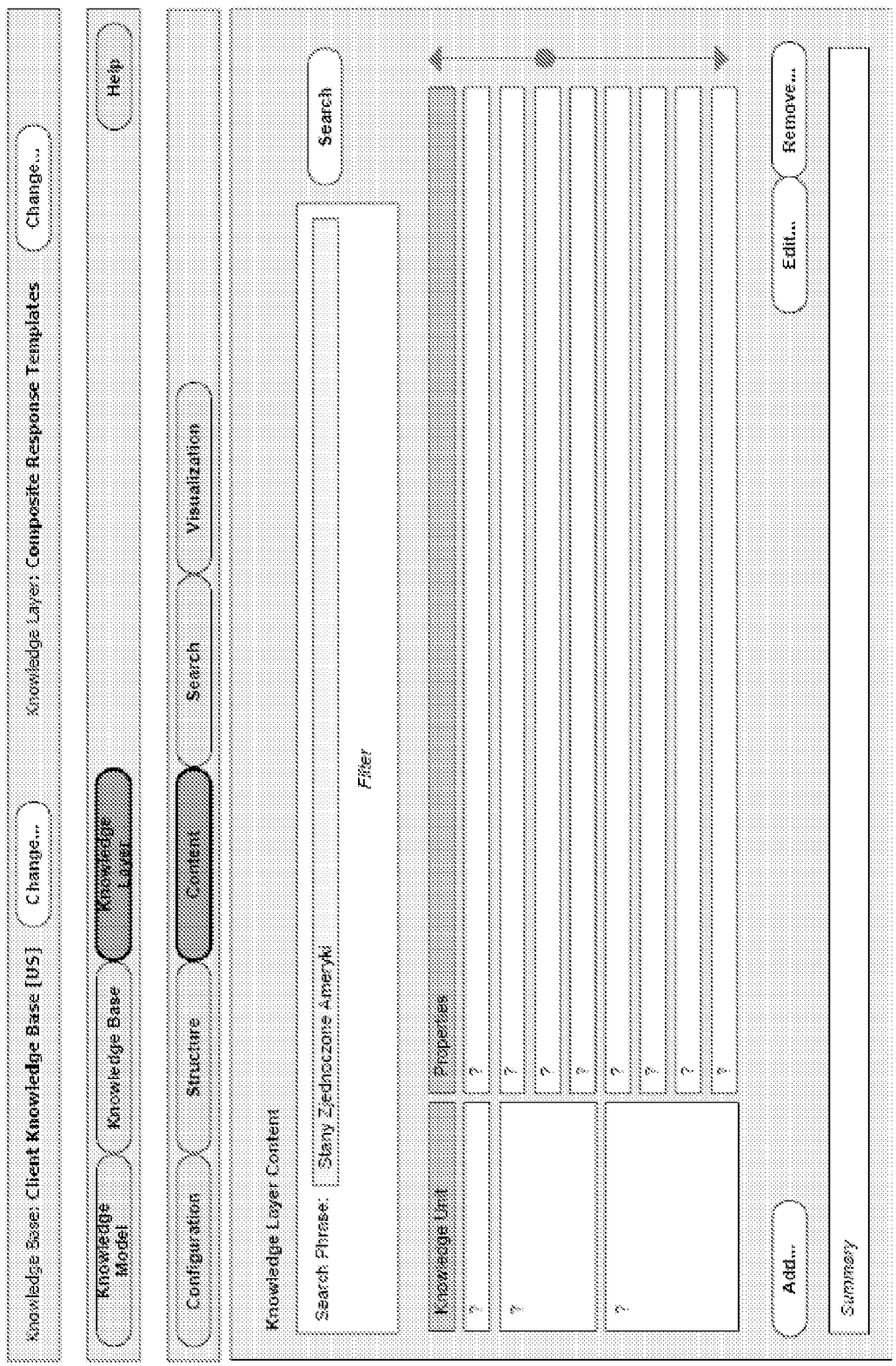

As illustrated in the screen shot of FIGS. 30-34, the administrator can then select knowledge layer and content and be presented with a screen that allows the user to define layer content. As can be seen in FIG. 30, this content can be defined by a filter to be used to filter input, or search phrases and by a plurality of units and associated properties.

Figure 31:
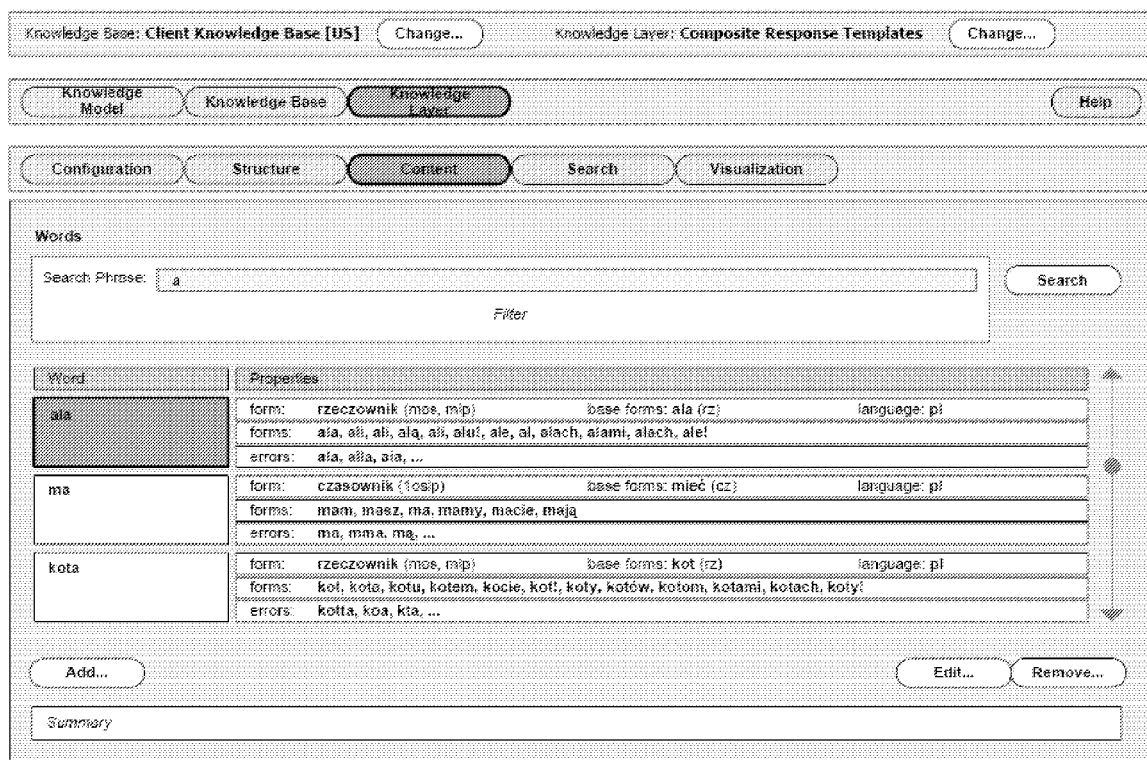
Figure 32:
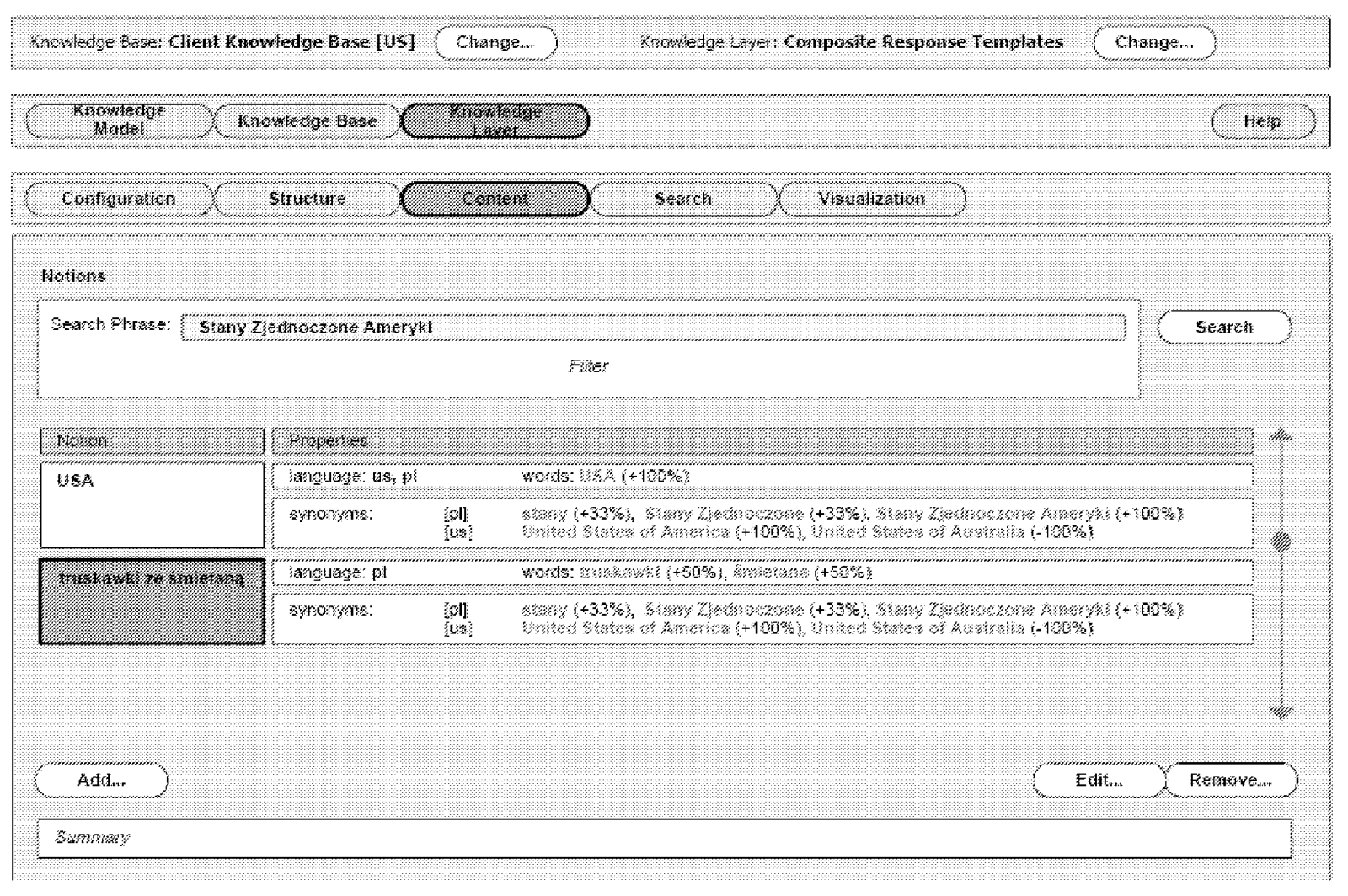

FIG. 31 illustrates the example where the content is a word and therefore the filter is a word filter. The search then produces candidate words (types) and illustrated the associated properties. Whereas FIG. 32 illustrates the case where the content is a notion. The filter then produces candidate notions and associated properties.

Figure 33:
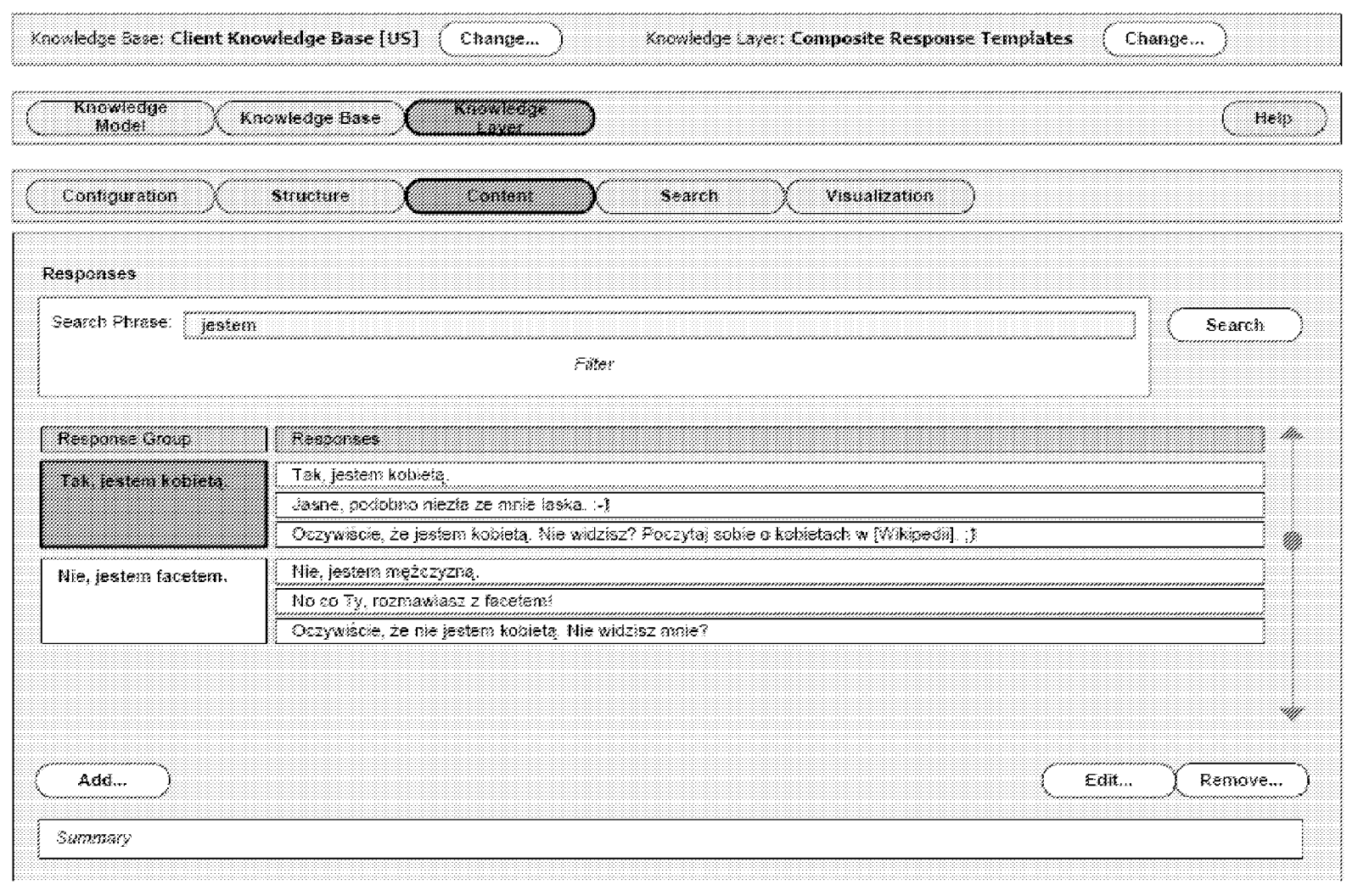
Figure 34:
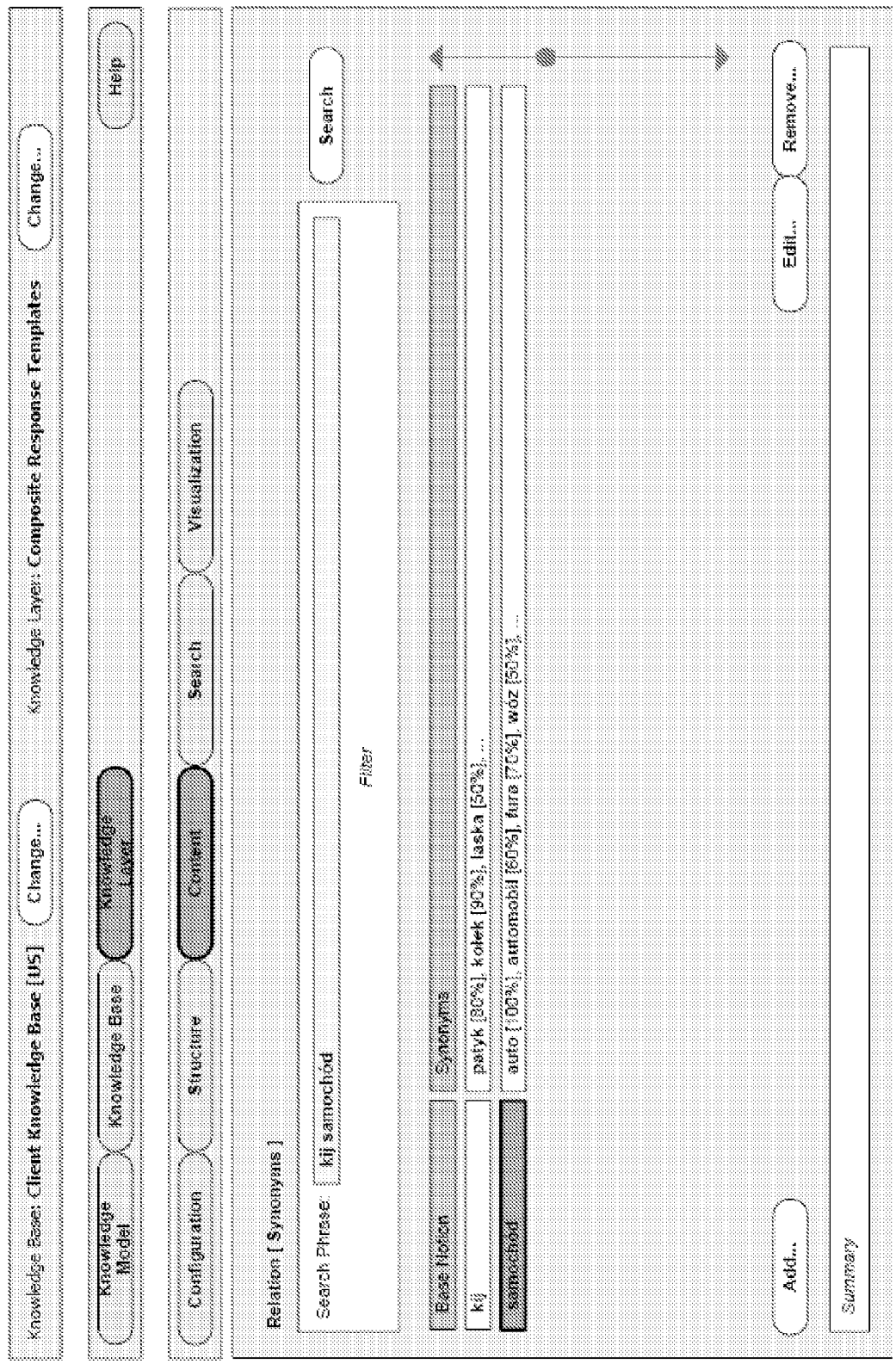

FIGS. 33 and 34 illustrate the cases where the content is a response and a relation respectively.

Figure 35:
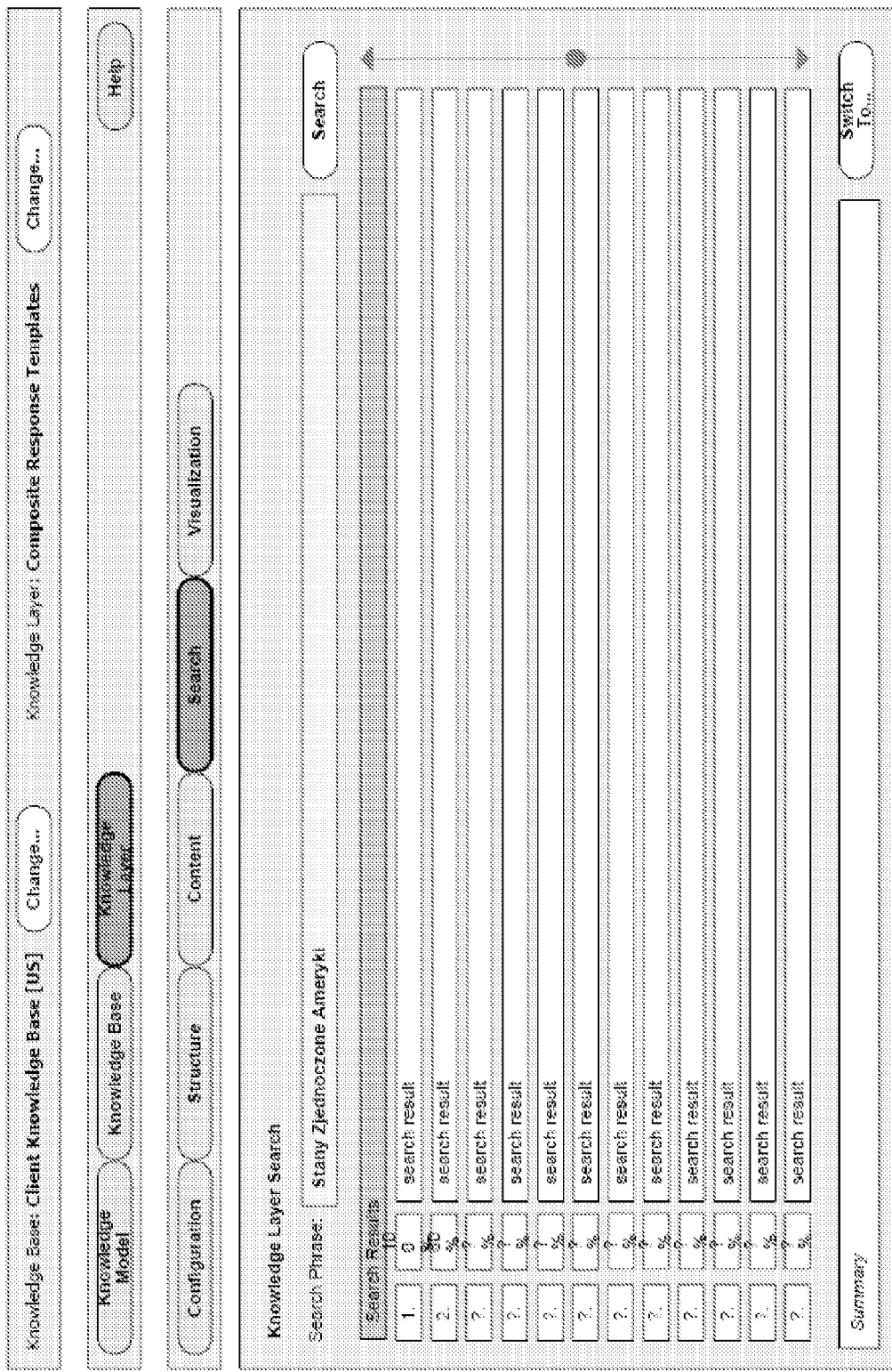

As illustrated in the screen shot of FIG. 35, the administrator can then select knowledge layer and search and be presented with a screen that allows the user to define how search results will be presented.

Figure 36:
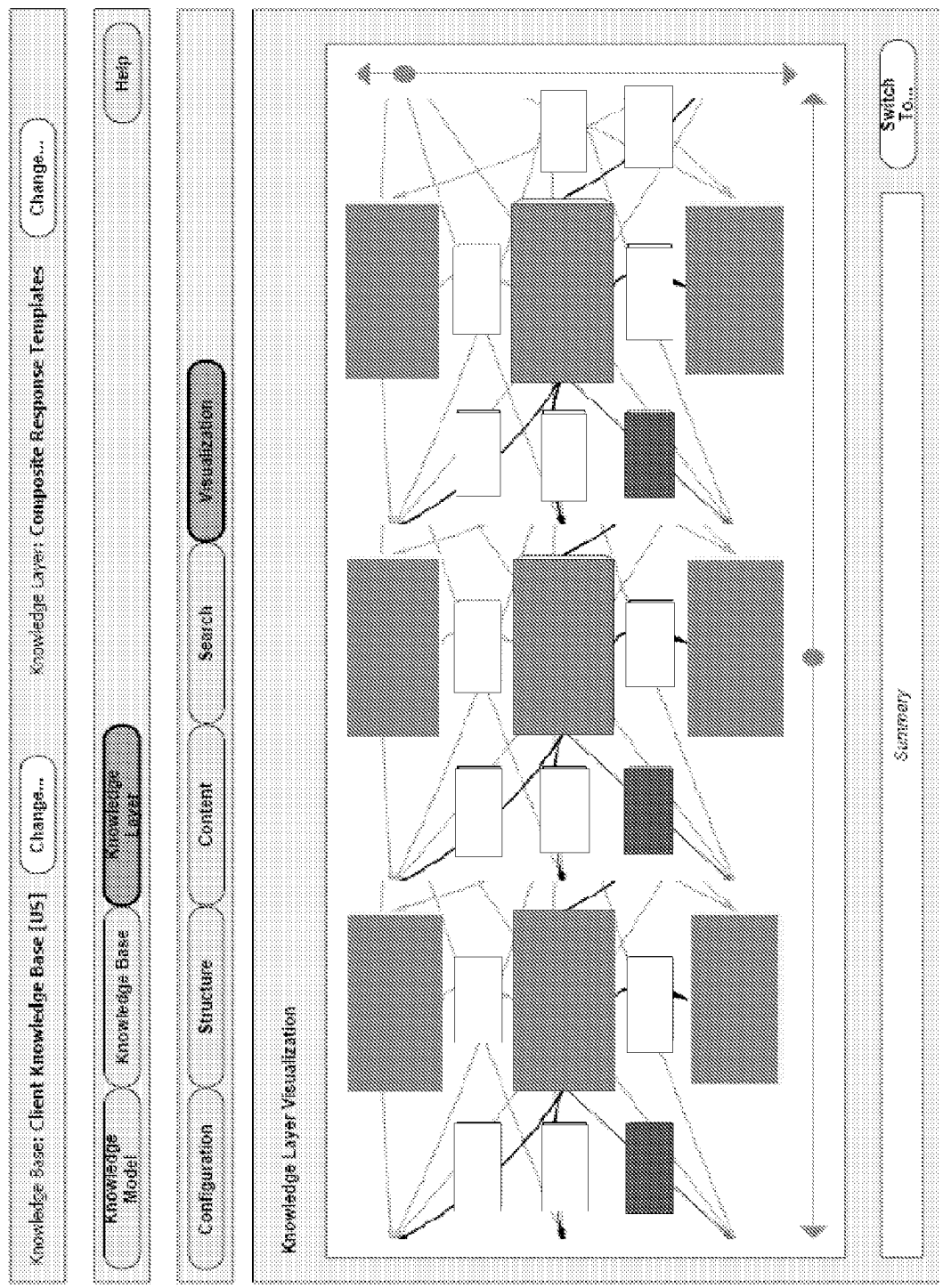
Figure 37:
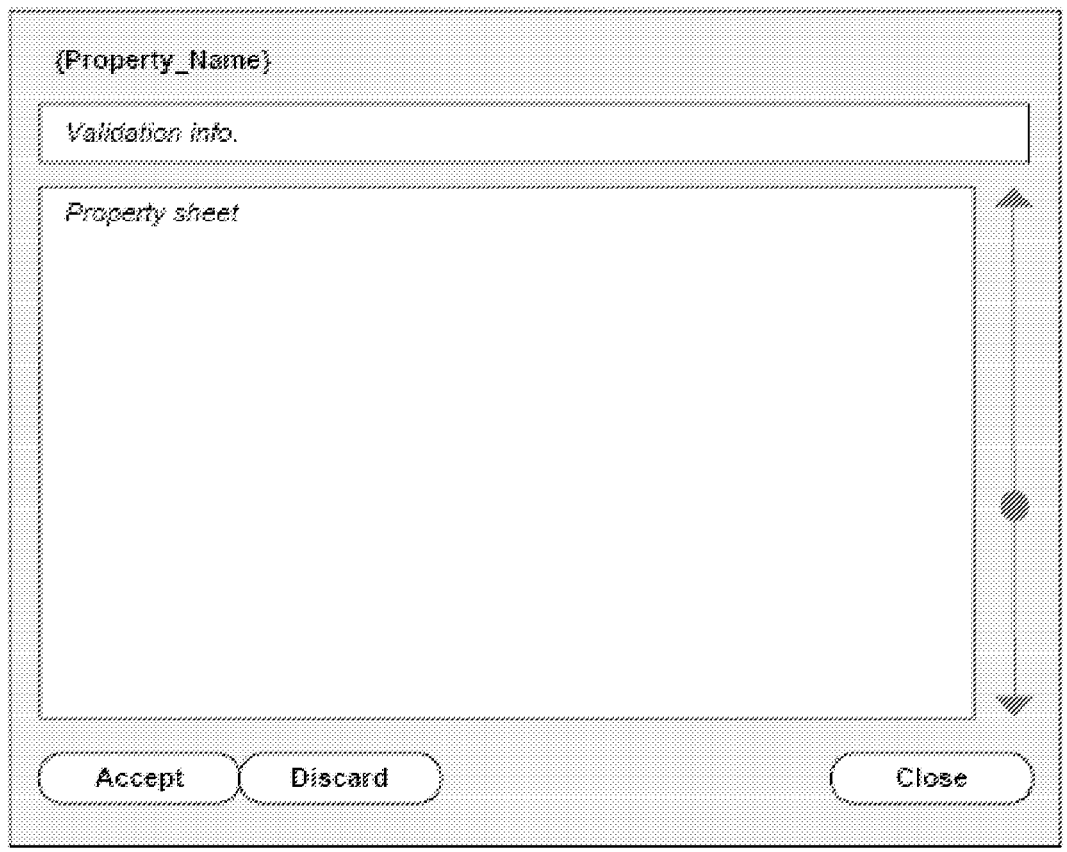

As illustrated in the screen shot of FIG. 36, the administrator can then select knowledge layer and visualization and be presented with a screen that allows the graphically illustrates the knowledge model.

FIGS. 37-40 are screen shots illustrating screens that can be presented to the administrator to allow the administrator to configure the unit properties for units used by the knowledge layers and bases.

FIGS. 38A and B are screen shots that illustrate example screens the administrator can use to define a number unit and its connection weight.

FIGS. 39A and B are screen shots that illustrate example screens the administrator can use to define a text unit and its response.

FIGS. 40A and B are screen shots that illustrate example screens the administrator can use to define a list unit and its response groups.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An interactive virtual agent (avatar) system, comprising:
a plurality of databases configured to store at least one of client specific information and non-client specific information;
internal resources configured to provide access to information sources;
a character interface configured to receive information from a user, and respond to the user with information based on the received information;
a knowledge model configured to define relations and connections between a plurality of knowledge bases, which comprise a plurality of knowledge layers that define paths from inputs to responses, wherein the plurality of knowledge bases comprise a combination of a general use knowledge base comprising knowledge layers that are used to determine the composition of a received input and a path leading from a question to answer, a corrective action knowledge base configured to correct mistakes in a received input, a generalization knowledge database configured to draw conclusions based on the parsed input, and a multiplicative knowledge base configured to weight relations between the outputs of various knowledge layers;
a processing engine comprising a computer processor that can be coupled with the client knowledge database, the basic knowledge database, the internal resources, and the character interface, the processing engine configured to:
receive input from the character interface;
parse the input using the knowledge model to determine the content of the input;
break the parsed input into sentences and words for matching into known notions and words using the knowledge model;
correct spelling and other mistakes for unmatched words and to weight possible variants of words in the parsed input;
use relations to transform words in the parsed input into notions and notions into other notions and then degrading the weighting of the transformed notions
determine relations that apply to the parsed content;
perform at least one of deduction, generalization, context expansion and synonym finding on the content using the determined relations;
using the knowledge model, and at least one of the plurality of databases, the internal resources, and external resources, determine an appropriate response to the input; and
provide the response to the character input to be output to the user.

2. The interactive virtual agent (avatar) system of claim 1, wherein the knowledge layers included in the general use knowledge base comprise a combination of a word knowledge layer configured to determine the words included in a received input, a notion knowledge layer configured to determine the notions included in the received input, a patterns knowledge layer configured to control a process of deduction engaged in by the processing engine, a response group knowledge layer configured to group responses into units, collect different versions of responses, a response knowledge layer configured to manage response statements, and a response component knowledge layer configured to manage reactions related to the response statements that can be portrayed to a user via the character interface.

3. The interactive virtual agent (avatar) system of claim 1, wherein the knowledge layers included in the corrective knowledge base comprise a combination of a additional word knowledge layer configured to identify misspelled or incorrect words and a set of relations configured to map misspelled or incorrect words to correct words.

4. The interactive virtual agent (avatar) system of claim 3, wherein mapping misspelled words comprises mapping misspelled or incorrect words onto a basic form and mapping a basic form onto many variants.

5. The interactive virtual agent (avatar) system of claim 1, wherein the knowledge layers included in the generalization knowledge base comprise a combination of relations including that allow the processing engine to draw conclusions and determine notions including synonym, anonym, superior clause, and subordinate clause.

6. The interactive virtual agent (avatar) system of claim 1, wherein the processing engine is further configured to match the notions to responses based on the weightings.

7. The interactive virtual agent (avatar) system of claim 6, wherein the processing engine is further configured to perform a net weighting of a selected response based on the individual weighting of the individual component responses.

8. The interactive virtual agent (avatar) system of claim 7, wherein the processing engine is further configured to select a response from a group of candidate responses based on the associated response net weighting.

9. The interactive virtual agent (avatar) system of claim 1, wherein the plurality of databases comprises a client knowledge database that is configured to store information specific to one or more clients.

10. The interactive virtual agent (avatar) system of claim 1, wherein the plurality of databases comprises a basic knowledge database that is configured to store information that is not specific to one or more clients.

11. The interactive virtual agent (avatar) system of claim 1, wherein the internal resources include at least one of a website, Really Simple Syndication (RSS) feeds, and information from an encyclopedic website.

12. The interactive virtual agent (avatar) system of claim 1, wherein the character interface comprises a text to speech processor, and wherein the character interface is configured to provide the output in a spoken language format using the text-to-speech processor.

13. The interactive virtual agent (avatar) system of claim 12, wherein the character interface is a visual character interface configured to respond to spoken input with spoken output.

14. The interactive virtual agent (avatar) system of claim 13, wherein the visual interface is a video character interface.

15. The interactive virtual agent (avatar) system of claim 13, wherein the visual interface is a cartoon character interface.

16. The interactive virtual agent (avatar) system of claim 1, wherein the character interface is configured to receive spoken input, and wherein the processing engine comprises a natural language processor configured to receive the spoken input from the character interface and process the spoken input.

* * * * *